United States Patent
Kosuda et al.

(10) Patent No.: US 8,582,415 B2
(45) Date of Patent: Nov. 12, 2013

(54) MULTILAYER OPTICAL RECORDING MEDIUM

(75) Inventors: Atsuko Kosuda, Tokyo (JP); Takashi Kikukawa, Tokyo (JP); Tomoki Ushida, Tokyo (JP); Motohiro Inoue, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/368,573

(22) Filed: Feb. 8, 2012

(65) Prior Publication Data

US 2012/0201118 A1 Aug. 9, 2012

(30) Foreign Application Priority Data

Feb. 9, 2011 (JP) .................................. 2011-025584

(51) Int. Cl.
*G11B 7/24* (2013.01)

(52) U.S. Cl.
USPC ........ 369/275.1; 369/94; 369/275.5; 369/283

(58) Field of Classification Search
USPC .............. 369/275.1, 275.2, 275, 4, 275.5, 94, 369/283, 284
See application file for complete search history.

(56) References Cited

U.S. PATENT DOCUMENTS

2009/0016184 A1* 1/2009 Kikukawa et al. ......... 369/47.53
2009/0290467 A1* 11/2009 Tomiyama et al. ............. 369/94
2009/0303864 A1* 12/2009 Nagata et al. ................. 369/283
2010/0220574 A1* 9/2010 Kojima et al. ............. 369/275.1
2011/0205867 A1* 8/2011 Kikukawa et al. ............ 369/283
2011/0205877 A1* 8/2011 Watanabe et al. ......... 369/53.23
2011/0206889 A1* 8/2011 Mitsumori et al. .......... 428/64.4
2012/0102509 A1* 4/2012 Inoue et al. .................... 720/718

FOREIGN PATENT DOCUMENTS

WO WO 2010013321 A1 * 2/2010

OTHER PUBLICATIONS

Ichimura et al., "Proposal for a Multilayer Read-Only-Memory Optical Disk Structure", Applied Optice 45 (8):1794-1803 (2006).
Mishima et al., "150 GB, 6-layer Write Once Disc for BLu-ray Disc System" Proc fo SPIE vol. 6282 62820I-1-62820I-10 (2006).

* cited by examiner

*Primary Examiner* — Thang Tran
(74) *Attorney, Agent, or Firm* — Porzio, Bromberg & Newman, P.C.

(57) ABSTRACT

An object of the present invention is to increase the number of stacked layers in a multilayer optical recording medium while simplifying the design of the multilayer optical recording medium is provided a multilayer optical recording medium including at least four recording and reading layers from which information can be reproduced by light irradiation, the layers stacked through intermediate layers. The multilayer optical recording medium includes a plurality of recording and reading layers that are continuous in order of stacking and includes at least one recording and reading layer group in which reflectance in a stacked state decreases from a near side of a light incident surface to a far side. A single-layer reflectance of the nearest recording and reading layer is set to 0.2% or more and less than 2.0%, and a light transmittance improvement process is applied to the light incident surface.

17 Claims, 24 Drawing Sheets

| STACKING CONFIGURATION | INTERMEDIATE LAYER THICKNESS (um) | POSITION FROM LIGHT INCIDENT SURFACE (um) |
|---|---|---|
| L0 RECORDING/READING LAYER 14A | | 174 |
| FIRST INTERMEDIATE LAYER 16A | 12 | |
| L1 RECORDING/READING LAYER 14B | | 162 |
| SECOND INTERMEDIATE LAYER 16B | 16 | |
| L2 RECORDING/READING LAYER 14C | | 146 |
| THIRD INTERMEDIATE LAYER 16C | 12 | |
| L3 RECORDING/READING LAYER 14D | | 134 |
| FOURTH INTERMEDIATE LAYER 16D | 16 | |
| L4 RECORDING/READING LAYER 14E | | 118 |
| FIFTH INTERMEDIATE LAYER 16E | 12 | |
| L5 RECORDING/READING LAYER 14F | | 106 |
| SIXTH INTERMEDIATE LAYER 16F | 16 | |
| L6 RECORDING/READING LAYER 14G | | 90 |
| SEVENTH INTERMEDIATE LAYER 16G | 12 | |
| L7 RECORDING/READING LAYER 14H | | 78 |
| EIGHTH INTERMEDIATE LAYER 16H | 16 | |
| L8 RECORDING/READING LAYER 14I | | 62 |
| NINTH INTERMEDIATE LAYER 16I | 12 | |
| L9 RECORDING/READING LAYER 14J | | 50 |
| COVER LAYER | 48 | |
| HARD COAT LAYER | 2 | |
| LOW REFRACTIVE INDEX FILM | | |

Fig.4

| RECORDING LAYER | SINGLE LAYER REFLECTANCE | STACKING REFLECTANCE | SINGLE LAYER ABSORPTANCE | STACKING ABSORPTANCE |
|---|---|---|---|---|
| L0 | 8.5% | 1.4% | 13.5% | 5.4% |
| L1 | 6.2% | 1.5% | 10.6% | 5.2% |
| L2 | 4.1% | 1.3% | 8.8% | 4.9% |
| L3 | 3.2% | 1.3% | 7.5% | 4.8% |
| L4 | 2.5% | 1.2% | 6.7% | 4.7% |
| L5 | 2.1% | 1.2% | 6.0% | 4.6% |
| L6 | 1.7% | 1.2% | 5.5% | 4.5% |
| L7 | 1.4% | 1.1% | 5.0% | 4.5% |
| L8 | 1.2% | 1.1% | 4.7% | 4.4% |
| L9 | 1.1% | 1.1% | 4.4% | 4.4% | ns
MULTILAYER OPTICAL RECORDING MEDIUM

CROSS-REFERENCE TO RELATED APPLICATION

This application claims priority to JP 2011-025584 filed Feb. 9, 2011, the entirety of which is hereby incorporated by reference into this application.

BACKGROUND OF THE INVENTION

1. Field of the Invention

The present invention relates to a multilayer optical recording medium including a plurality of stacked recording and reading layers from which information can be reproduced by light irradiation.

2. Description of the Related Art

In the field of optical recording media, a wavelength of a laser light source is shortened and an NA of an optical system is increased in order to increase a recording density. For example, in an optical recording medium of a Blu-ray Disc (BD) standard, the wavelength of the laser is set to 405 nm, and the numerical aperture is set to 0.85 to allow recording and reading of 25 GB capacity per layer. However, efforts based on the light source and the optical system are reaching a limit, and volume recording for multiplexed recording of information in the optical axis direction is required to further increase the recording capacity. For example, in the optical recording medium of the Blu-ray Disc (BD) standard, a multilayer optical recording medium including eight recording and reading layers (see I. Ichimura et. al., Appl. Opt., 45, 1794-1803 (2006)) or six recording and reading layers (see K. Mishima et. al., Proc. of SPIE, 6282, 628201 (2006)) is proposed.

SUMMARY OF THE INVENTION

To arrange four or more recording and reading layers in a multilayer optical recording media, for example, the transmittance of the recording and reading layers needs to be increased to a level such that the reflectance in a single-layer state of the recording and reading layers is less than about 2% to allow more light to reach the far side of the multilayer optical recording medium.

According to unpublished knowledge of the present inventors, the transmittance of the recording and reading layers needs to be increased to further increase the number of layers. As a result, reflection of light that may occur on the light incident surface, which did not have to be considered in the past, becomes a new factor of inhibiting the increase in the number of layers from various viewpoints. For example, if the reflectance of the recording and reading layers is reduced to increase the transmittance while the reflectance of the light incident surface is greater than that, the reflected light on the light incident surface is easily included as signal noise in a reproduction signal.

Even if the transmittance of the recording and reading layers is significantly increased to allow more light to reach the far side of the multilayer optical recording medium, the light intensity, which is prerequisite, incident on the multilayer optical recording medium is reduced if the reflectance of the light incident surface is large, and the increase in the capacity is inhibited.

The present invention has been made in view of the problem, and an object of the present invention is to provide a multilayer optical recording medium that can simplify the design of the multilayer optical recording medium to reduce the load of a manufacturing process in increasing the number of recording and reading layers.

The object is achieved by the following means based on intensive studies by the present inventors.

More specifically, the present invention that achieves the object provides a multilayer optical recording medium including at least four recording and reading layers from which information can be reproduced by light irradiation, the layers stacked in advance or formed later, wherein a reflectance in a single-layer state of the recording and reading layer closest to a light incident surface is set to 0.2% or more and less than 2.0%, and a light transmittance improvement process is applied to the light incident surface.

In relation to the invention, the multilayer optical recording medium further includes at least one recording and reading layer group including a plurality of recording and reading layers that are continuous in order of stacking and in which reflectance in a stacked state decreases from a near side of the light incident surface to a far side of the light incident surface.

In relation to the invention, the light transmittance improvement process of the multilayer optical recording medium improves light transmittance in the light incident surface by 2.0% or more.

In relation to the invention, the reflectance of the light incident surface and the reflectance of the recording and reading layer closest to the light incident surface are set to less than 2.0% in the multilayer optical recording medium.

In relation to the invention, interlayer distances between the recording and reading layers are set to two or fewer types in the multilayer optical recording medium.

In relation to the invention, first intermediate layers with a first film thickness and second intermediate layers with a second film thickness greater than the first film thickness are alternately stacked in the multilayer optical recording medium, and the recording and reading layers are stacked between the first and second intermediate layers.

In relation to the invention, a cover layer formed by a substantially transparent resin material is arranged between the light incident surface and the recording and reading layer closest to the light incident surface in the multilayer optical recording medium, and in the light transmittance improvement process, a low refractive index film with a lower refractive index in recording light or reading light compared to the refractive index of the cover layer is formed on a surface of the cover layer.

In relation to the invention, a cover layer formed by a substantially transparent resin material is arranged between the light incident surface and the recording and reading layer closest to the light incident surface in the multilayer optical recording medium, and in the light transmittance improvement process, fine concavities and convexities are formed on a surface of the cover layer.

In relation to the invention, in the light transmittance improvement process, the fine concavities and convexities are directly formed on the surface of the cover layer in the multilayer optical recording medium.

In relation to the invention, the recording and reading layer group is stacked in advance in the multilayer optical recording medium, and material compositions and film thicknesses of the recording and reading layers belonging to the same recording and reading layer group in the multilayer optical recording medium are substantially the same.

In relation to the invention, optical constants of the recording and reading layers belonging to the same recording and reading layer group in the multilayer optical recording medium are substantially the same.

In relation to the invention, the number of the recording and reading layer groups is two or more in the multilayer optical recording medium, the reflectances in the single-layer state of the recording and reading layers approximately conform within the belonging recording and reading layer group, and the reflectance of the recording and reading layer group closest to the light incident surface is smaller than the reflectances of the rest of the recording and reading layer groups.

In relation to the invention, a wavelength of irradiation light used in recording or reading of the recording and reading layers is 405 nm in the multilayer optical recording medium.

In relation to the invention, a distance between the light incident surface and the recording and reading layer closest to the light incident surface in the multilayer optical recording medium is less or equal 60 μm.

According to the present invention, in the multilayer optical recording medium, the number of layers can be further increased while the design is simplified and the quality of the reproduction signal can also be improved.

BRIEF DESCRIPTION OF THE DRAWINGS

FIG. 4 is a diagram showing a film thickness configuration of the multilayer optical recording medium;

DETAILED DESCRIPTION OF THE PREFERRED EMBODIMENT

Figure 1:
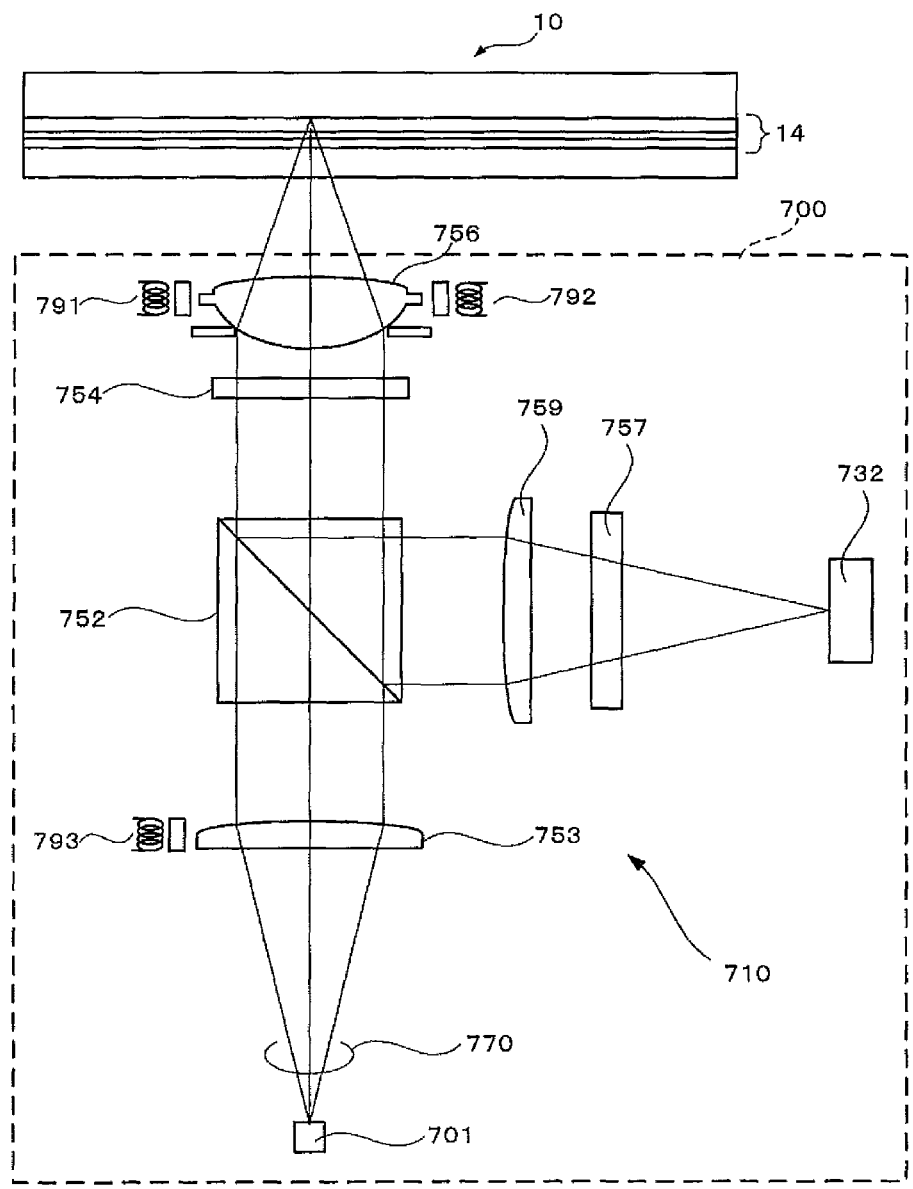
FIG. 1 is a diagram showing a schematic configuration of a multilayer optical recording medium and an optical pickup that records and reproduces the multilayer optical recording medium according to an embodiment of the present invention.

A basic idea of a multilayer optical recording medium according to an embodiment of the present invention will be described.

At least four recording and reading layers are stacked in the multilayer optical recording medium through intermediate layers. The reflectance of the recording and reading layer closest to a light incident surface is set to 0.2% or more and less than 2.0%. If the reflectance of the recording and reading layer is set small, the light intensity at reaching inside the multilayer optical recording medium increases, and the number of stacked recording and reading layers can be increased.

A light transmittance improvement process is applied to the light incident surface of the multilayer optical recording medium. As described, an optical loss (light reflection) at the light incident surface has a large effect when the reflectance of the recording and reading layers is low, such as 0.2% or more and less than 2.0%. Therefore, the light transmittance improvement process is applied to the light incident surface to reduce the loss of the irradiation light passing through the light incident surface as much as possible. As a result, the number of recording and reading layers can be increased. The application of the light transmittance improvement process to the light incident surface also inhibits the reflected light on the light incident surface from becoming noise that adversely affects the signal quality.

In the light transmittance improvement process, for example, a cover layer formed by a substantially transparent resin material is arranged between the light incident surface and the recording and reading layer closest to the light incident surface. A low refractive index film with a low refractive index in recording light or reading light compared to the refractive index of the cover layer is formed on the surface of the cover layer. The low refractive index film reduces the optical reflectance to allow the irradiation light to easily enter inside the multilayer optical recording medium. It is preferable to adopt an SiO2 film or a fluororesin film as the low refractive index film. It is preferable to set the refractive index of the cover layer to greater than 1.50 and set the refractive index of the low refractive index film to 1.50 or less.

In the light transmittance improvement process, for example, fine concavities and convexities can be directly or indirectly formed on the surface of the cover layer. The fine concavities and convexities can suppress the reflection of the irradiation light.

In the multilayer optical recording medium, the plurality of recording and reading layers include at least one recording and reading layer group. The recording and reading layer group includes a plurality of recording and reading layers that are continuous in order of stacking, and the reflectance in the stacked state continuously decreases from the near side of the light incident surface to the far side of the light incident surface. It is preferable that there are two types (T1 and T2) of thicknesses of the intermediate layers arranged between the recording and reading layers and that the two types are alternately stacked in the multilayer optical recording medium.

Figure 15:
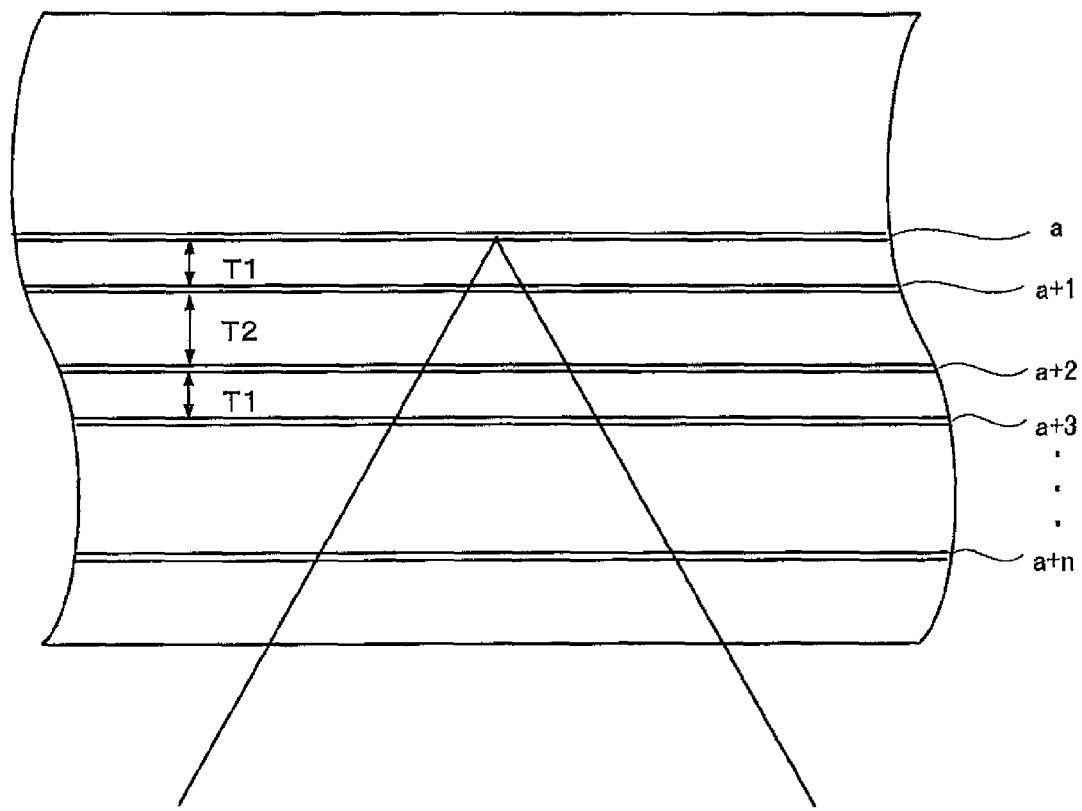
FIG. 15 is a diagram showing a state of the reading light for explaining a basic concept of the multilayer optical recording medium of the present invention.
Figure 16:
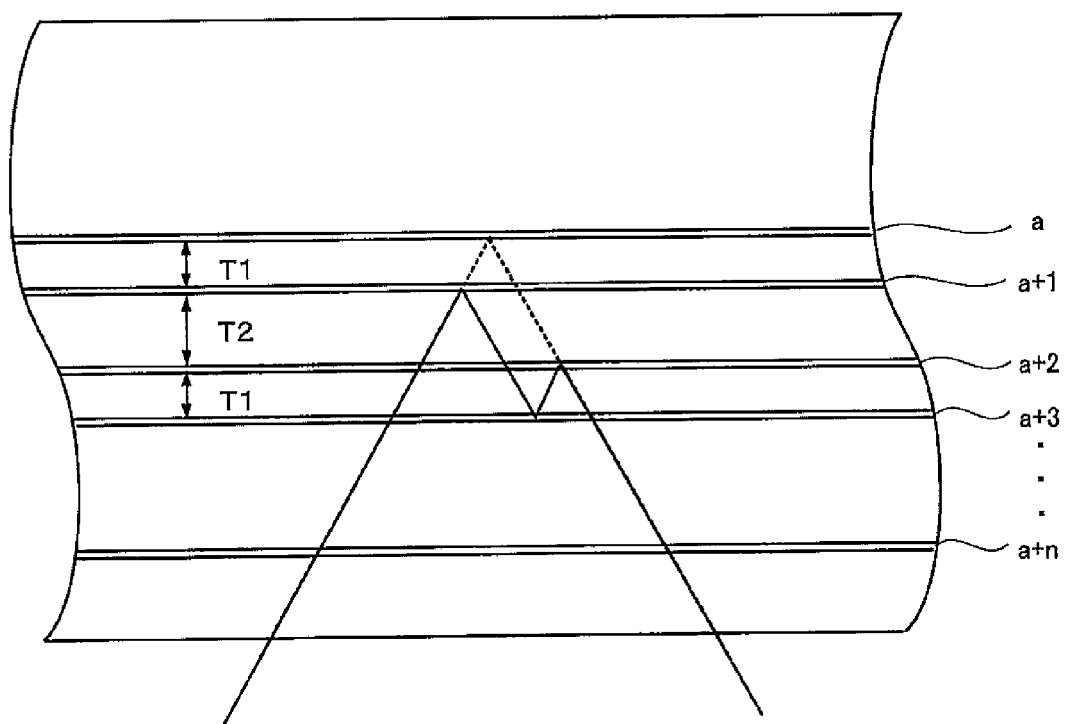
FIG. 16 is a diagram showing a state of stray light for explaining the basic concept of the multilayer optical recording medium of the present invention.

FIG. 15 shows a path of reading light (main light) directly reflected by an a-th recording and reading layer when the recording and reading layer is reproduced. FIG. 16 shows an example of a path of stray light with an optical path length equal to that of the main light. The reflectance and the transmittance in the single-layer state of a material forming a k-th recording and reading layer are defined as $r_k$ and $t_k$, respectively.

Assuming that the intensity of the main light when reading light with an intensity of "1" is incident on the a-th recording and reading layer is $I_a$ and that the intensity of the stray light is $I_a'$, $I_a$ and $I_a'$ are expressed by the following [Expression 1] and [Expression 2].

$$I_a = (t_{a+1} \times t_{a+2} \times t_{a+3} \times \ldots \times t_{a+n})^2 \times r_a \quad \text{[Expression 1]}$$

$$I_a' = (t_{a+2} \times t_{a+3} \times \ldots \times t_{a+n}) \times r_{a+1} \times \quad \text{[Expression 2]}$$
$$t_{a+2} \times r_{a+3} \times r_{a+2} \times (t_{a\times+3} \times \ldots \times t_{a+n}) =$$
$$(t_{a+2} \times t_{a+3} \times \ldots \times t_{a+n})^2 \times r_{a+1} \times r_{a+2} \times r_{a+3}$$

Therefore, an intensity ratio $I_a'/I_a$ of the stray light to the main light can be expressed by Expression 3.

$$I_a'/I_a = (t_{a+2} \times t_{a+3} \times \ldots \times t_{a+n})^2 \times r_{a+1} \times r_{a+2} \times \quad \text{[Expression 3]}$$
$$r_{a+3}/(t_{a+1} \times t_{a+2} \times t_{a+3} \times \ldots \times t_{a+n})^2 \times r_a =$$
$$(r_{a+1} \times r_{a+2} \times r_{a+3})/(t_{a+1}^2 \times r_a)$$

a[3]3

As described, in the multilayer recording medium including the alternately arranged intermediate layers with two types of thicknesses, it can be recognized that the following three notions are effective to reduce the effect of a confocal crosstalk in the a-th recording and reading layer, i.e. to reduce the intensity ratio of the stray light of [Expression 3].

Increase the reflectance $r_a$ of the a-th layer.
(2) Reduce the reflectances $r_{a+1}$, $r_{a+2}$, and $r_{a+3}$ of an a+1-th layer, an a+2-th layer, and an a+3-th layer (three layers adjacent on the side of the light incident surface (near side) of the a-th layer).
(3) Increase the transmittance $t_{a+1}$ of the a+1-th layer (one layer adjacent in front of the a-th recording and reading layer).

To attain the notions in all recording and reading layers, the reflectances of all recording and reading layers except the recording and reading layer that cannot be a layer in front of the other recording and reading layers, i.e. the recording and reading layer most remote (farthest) from the light incident surface, can be reduced, and the transmittance can be increased. To realize this, it is significantly convenient in the design of the medium to set the same reflectance r and transmittance t in the single-layer state of all recording and reading layers except the farthest recording and reading layers. In this case, the reflectance r of the recording and reading layers is set low, and the transmittance t is set high. Specifically, it is preferable to set the reflectance r to 0.2% or more and less than 2.0%. Obviously, if the reflectance r and the transmittance t of all recording and reading layers including the farthest recording and reading layer are the same, the design of the medium can be simplified to the maximum extent, although the stray light reduction effect in the farthest recording and reading layer is reduced.

As described, if the optical constants of different recording and reading layers are conformed, i.e. if the same reflectance r and transmittance t are set, reflectance R in the stacked state (hereinafter, called "stacking reflectance") of the recording and reading layers on the farther side is observed low in the multilayer optical recording medium. This indicates the recording and reading layer group. Therefore, in the case of setting the same reflectance r and transmittance t for all recording and reading layers, the stacking reflectance R monotonically decreases from the recording and reading layer on the near side to the recording and reading layer on the far side, and all recording and reading layers belong to one recording and reading layer group. The reflectance in the stacked state denotes reflectance obtained from the ratio of the incident light and the reflected light when light is irradiated on a specific recording and reading layer of the multilayer optical recording medium after the completion.

To conform the optical constants of the plurality of recording and reading layers, it is convenient to conform the composition and the film thickness of the recording material that forms the recording and reading layers. This rationally reduces the burden in the design of the medium and in the manufacturing. As a result, it is desirable to conform the composition and the film thickness of the recording material that forms the plurality of recording and reading layers to realize the conceptual idea of the multilayer optical recording medium according to the present invention. More preferably, the material composition and the film thickness are substantially the same in all recording and reading layers including the recording and reading layer farthest from the light incident surface, and as a result, the optical constants are also conformed.

The fact that the composition and the film thickness of the recording and reading layers are substantially the same in the multilayer optical recording medium is synonymous with, for example, the fact that results obtained by measuring the film thickness of a sample, which is obtained by cutting a disk in a cross-sectional direction by a microtome, using a Transmission Electron Microscope (TEM) or a Scanning Electron Microscope (SEM) and further analyzing the composition by Energy Dispersive Spectroscopy or the like of the microscopes are substantially almost the same in the recording and reading layers. In such a state, the material composition and the film thickness of the recording and reading layers can be considered the same. As a result, the optical constants of the recording and reading layers obviously conform.

Since the transmittance $t_k$ is a value greater than 0 and smaller than 1, the reflected light intensity $I_a$ decreases if the number of layers n+1 of the recording and reading layer increases. If the reflected light intensity $I_a$ is too low, the SNR (signal-noise ratio) is reduced, and the sensitivity reaches the limit of the photo detector of the optical pickup. In principle, the sensitivity limit is the upper limit of the number of layers of the recording and reading layers. From this, it can be understood that the number of recording and reading layers can be increased by improving the light transmittance of the light incident surface.

Specifically, in the design stage, the recording and reading layers with the same optical constants are sequentially stacked from the side of the light incident surface to the far side, and the maximum number of layers is set where the stacking reflectance R reaches the sensitivity limit that can be handled by the optical pickup.

Figure 17:
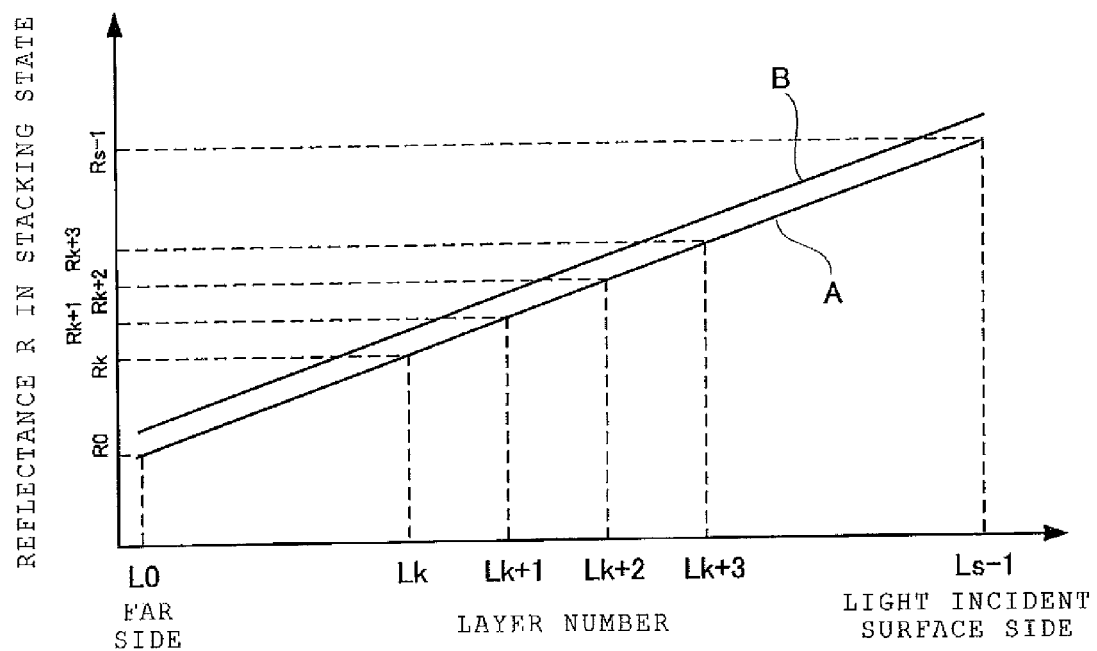
FIG. 17 is a diagram showing a change in the stacking reflectance for explaining the basic concept of the multilayer optical recording medium of the present invention.

Based on the conceptual idea, FIG. 17 shows an example of forming a multilayer optical recording medium that realizes an increase in the number of s layers. A line A of a reference example in FIG. 17 indicates a state in which the light transmittance improvement process is not applied to the light incident surface, and the stacking reflectance R monotonically decreases from a recording and reading layer ($L_{s-1}$ layer) located closest to the light incident surface to a recording and reading layer ($L_0$ layer) located on the farthest side through recording and reading layers ($L_{k+1}$ layer, $L_k$ layer, and $L_{k-1}$ layer) in between. A line B of the present invention in FIG. 17 indicates a state in which the recording and reading layers are designed under exactly the same conditions as in the reference example, except that the light transmittance improvement process is applied to the light incident surface. In this way, the application of the light transmittance improvement process to the light incident surface increases the intensity of the light that reaches inside the medium, and the overall stacking reflectance of the recording and reading layers can be increased. As a result, there is a margin in the reflectance in the stacked state of the farthest recording and reading layer. Therefore, as shown for example in FIG. 18, the number of stacked layers can be increased to s+1 layers from the nearest $L_s$ recording and reading layer to the farthest $L_0$ recording and reading layer by further adding a recording and reading layer on the far side.

In general, the ratio of the stacking reflectances ($R_{n-1}$ and $R_0$) of the recording and reading layer ($L_{n-1}$ layer) located closest to the light incident surface and the recording and reading layer ($L_0$ layer) located on the farthest side, respectively is determined from the limit of the dynamic range of the reflectance that can be handled by a general optical pickup. It is preferable that the ratio is less or equal 5:1, and it is desirable that the ratio is less or equal 4:1. More specifically, it is preferable that $R_0/R_{n-1}(1/5)$, and it is desirable that $R_0/R_{n-1}(1/4)$.

Figure 18:
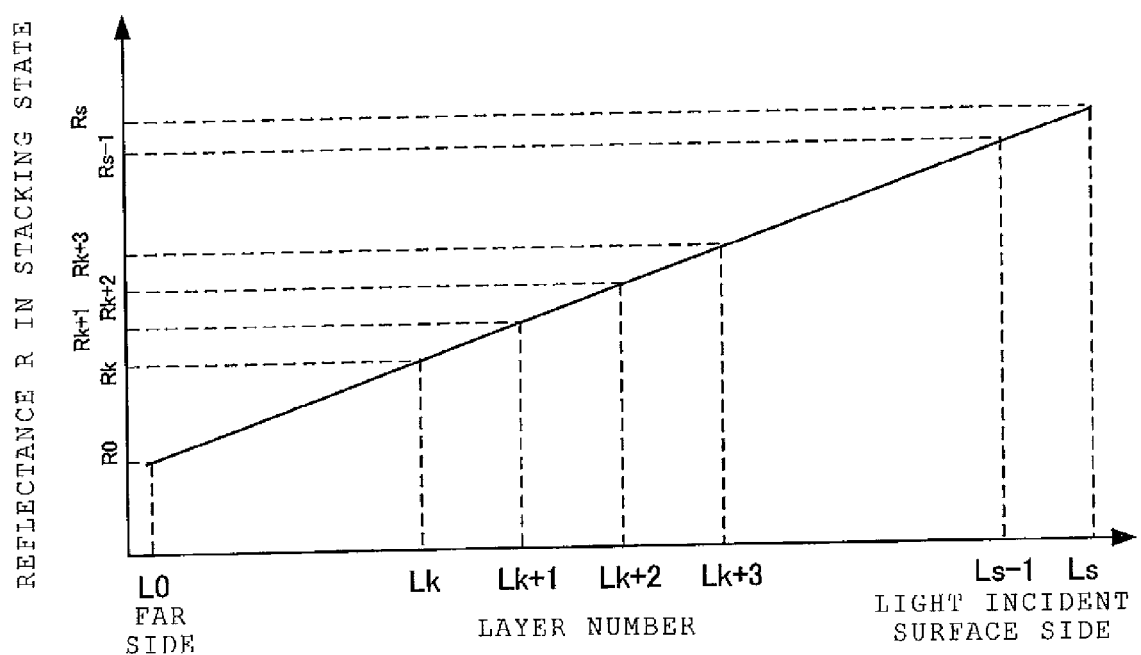
FIG. 18 is a diagram showing a change in the stacking reflectance for explaining the basic concept of the multilayer optical recording medium of the present invention.
Figure 19:
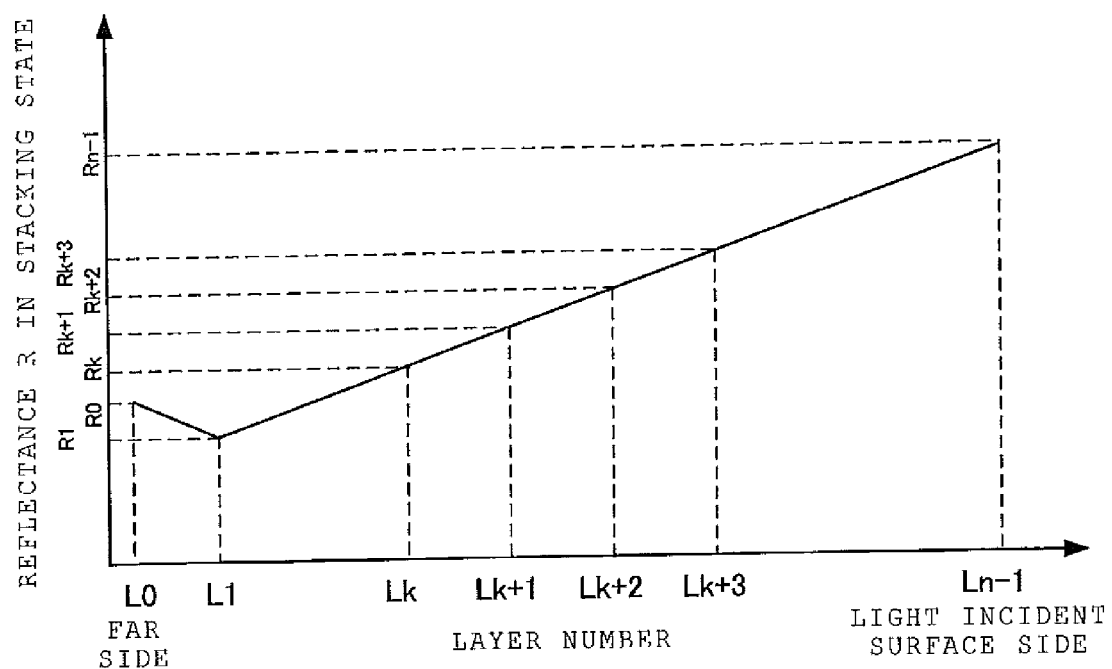
FIG. 19 is a diagram showing a change in the stacking reflectance for explaining the basic concept of the multilayer optical recording medium of the present invention.

A concept of matching the optical constants of all recording and reading layers is illustrated in FIGS. 17 and 18. However, as shown in FIG. 19, for the recording and reading layer ($L_0$ layer) located on the farthest side, a material composition or film thickness different from that of the rest of the recording and reading layers can be adopted, and the optical constants may not be conformed. This is because there is no recording and reading layer on the far side of the $L_0$ layer, and the light transmittance does not have to be taken into account.

Hereinafter, an embodiment of the present invention will be described with reference to the attached drawings.

FIG. 1 shows a configuration of a multilayer optical recording medium 10 according to a first embodiment and an optical pickup 700 used for recording and reading of the multilayer optical recording medium 10.

The optical pickup 700 includes an optical system 710. The optical system 710 is an optical system that performs recording and reading for a recording and reading layer group 14 of the multilayer optical recording medium 10. A diverging beam 770 with a relatively short 380 to 450 nm (405 nm here) blue wavelength emitted from a light source 701 passes through a collimator lens 753 that includes spherical aberration correction means 793 and enters a polarization beam splitter 752. The beam 770 that has entered the polarization beam splitter 752 passes through the polarization beam splitter 752 and further passes through a quarter wavelength plate 754 to be converted to circularly polarized light. The light is converted to a convergent beam by an objective lens 756. The beam 770 is collected on a recording and reading layer of the plurality of recording and reading layer groups 14 formed inside the multilayer optical recording medium 10.

The beam 770 reflected by the polarization beam splitter 752 passes through a condensing lens 759 and is converted to convergent light. The beam 770 enters an optical detector 732 through a cylindrical lens 757. Astigmatism is provided to the beam 770 when the beam 770 passes through the cylindrical lens 757. The optical detector 732 includes four light receiving units not shown, and each light receiving unit outputs a current signal corresponding to the amount of light received. A focus error (hereinafter "FE") signal based on an astigmatic method, a tracking error (hereinafter "TE") signal based on a push-pull method that is output only during the reading, a reproduction signal of information recorded in the multilayer optical recording medium 10, and the like are generated from the current signals. The FE signal and the TE signal are amplified to a desired level, and the phase is compensated. The FE signal and the TE signal are fed back and supplied to actuators 791 and 792, and the focus and tracking are controlled.

Figure 2:
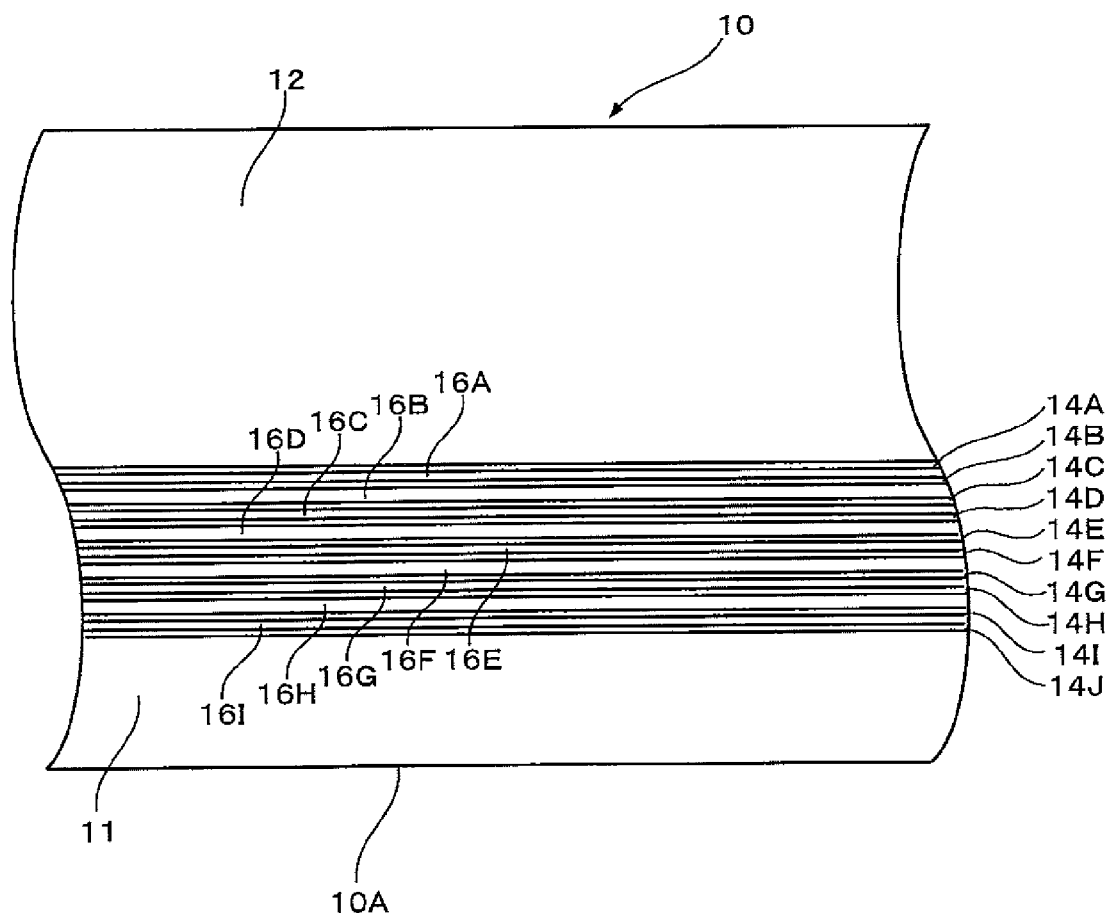
FIG. 2 is a cross-sectional view showing a stacking structure of the multilayer optical recording medium.

FIG. 2 shows an enlarged cross-sectional structure of the multilayer optical recording medium 10.

The multilayer optical recording medium 10 has a disc shape with an outer diameter of about 120 mm and a thickness of about 1.2 mm and includes three or more recording and reading layers. The multilayer optical recording medium 10 includes a light incident surface 10A applied with the light transmittance improvement process, a cover layer 11 that provides the light incident surface 10A, L0 to L9 recording and reading layers 14A to 14J with a ten-layer configuration, an intermediate layer group 16 that exists between the L0 to L9 recording and reading layers 14A to 14J, and a support substrate 12.

The support substrate 12 is provided with a groove with a track pitch of 0.32 um. Various materials, such as glass, ceramics, and resins, can be used as materials of the support substrate 12. Among the materials, the resins are preferable from the viewpoint of ease of molding. Examples of the resins include a polycarbonate resin, an olefin resin, an acrylic resin, an epoxy resin, a polystyrene resin, a polyethylene resin, a polypropylene resin, a silicone resin, a fluororesin, an ABS resin, and a urethane resin. Among the resins, the polycarbonate resin and the olefin resin are particularly preferable in view of processability and the like. Since the support substrate 12 does not serve as an optical path of the beam 770, the support substrate 12 does not have to have high light permeability.

The stacking reflectance of the L0 to L9 recording and reading layers 14A to 14J decreases from the light incident surface to the far side. More specifically, the stacking reflectance of the L9 recording and reading layer 14J closest to the light incident surface is the highest, and the stacking reflectance of the L0 recording and reading layer 14A is the lowest.

In the film design for realizing the stacking reflectance, the optical reflectance, the absorptance, and the like in the single-layer state of the L0 to L9 recording and reading layers 14A to 14J are optimized in accordance with the beam 770 in a blue wavelength region in an optical system 100. In the present embodiment, substantially the same optical constants are set in all L0 to L9 recording and reading layers 14A to 14J, and in this regard, substantially the same material composition and film thickness are set in the L0 to L9 recording and reading layers 14A to 14J.

Figure 3:
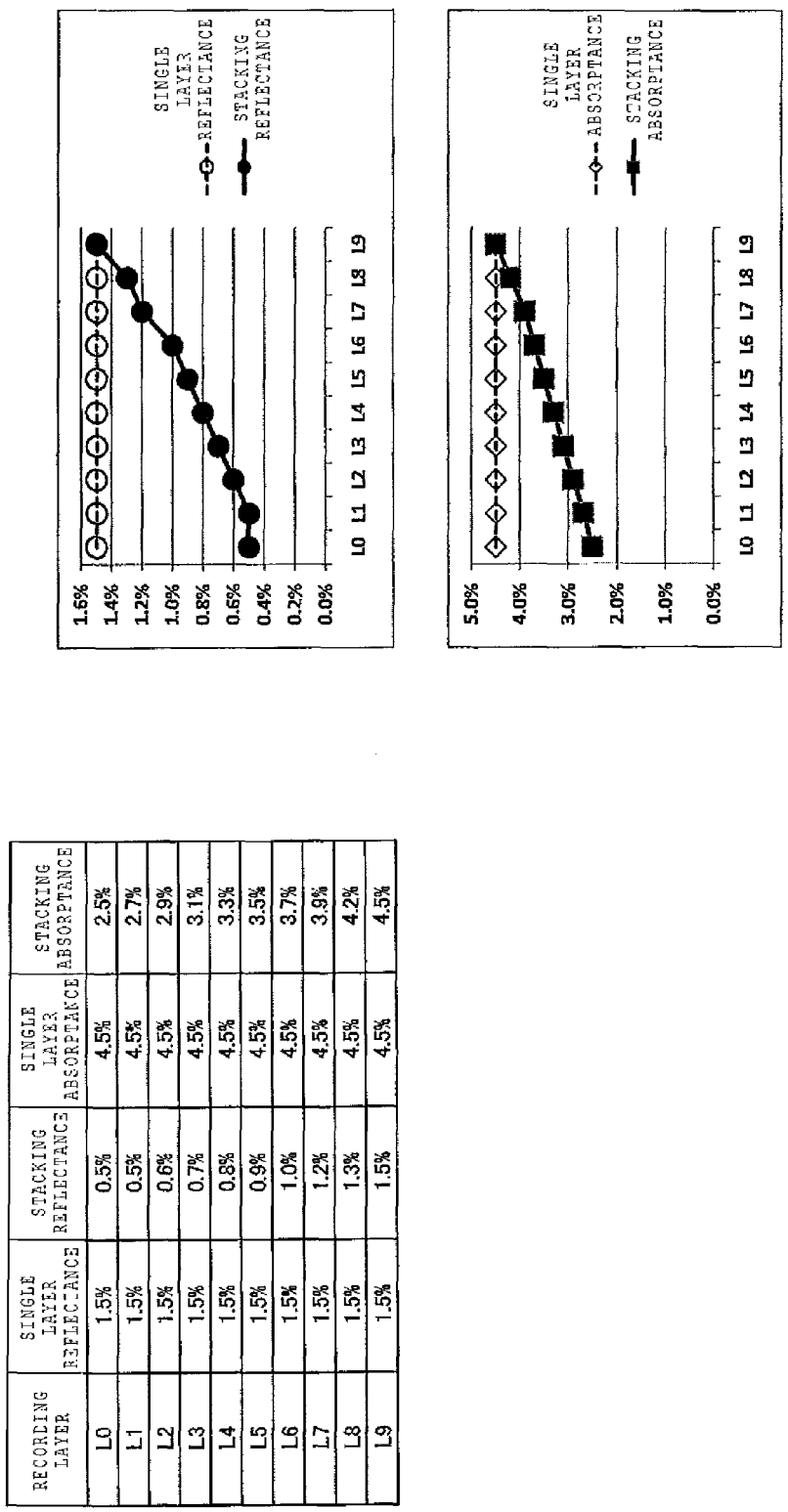
FIG. 3 is a table and graphs showing reflectance and absorptance of the multilayer optical recording medium.

Specifically, as shown in FIG. 3, the reflectance in the single-layer state (hereinafter, called "single-layer reflectance") is set to 1.5%, and the absorptance in the single-layer state (hereinafter, called "single-layer absorptance") is set to 4.5% in the L0 to L9 recording and reading layers 14A to 14J.

In this way, approximately the same single-layer reflectance and single-layer absorptance are set in the L0 to L9 recording and reading layers 14A to 14J in the present embodiment. As a result, the stacking reflectance monotonically decreases in the L0 to L9 recording and reading layers 14A to 14J in order from the side of the light incident surface.

As a result of adopting the film design, the L0 to L9 recording and reading layers 14A to 14J can be formed by almost the same recording material and film thickness, and a significant reduction of the manufacturing cost is realized.

Each of the L0 to L9 recording and reading layers 14A to 14J has a three to five-layer structure including dielectric films and the like stacked on both outer sides of a recordable recording film (not shown). The dielectric films of the recording and reading layers have a basic function of protecting the recordable recording film and a function as enlarging a difference between the optical characteristics before and after the formation of recording marks and improving the recording sensitivity.

The recording sensitivity is easily reduced if the energy absorbed by the dielectric films is large when the beam 770 is irradiated. Therefore, to prevent this, it is preferable to select a material with a low absorption coefficient (k) in the wavelength region of 380 nm to 450 nm (particularly 405 nm) as a material of the dielectric films. In the present embodiment, $TiO_2$ is used as the material of the dielectric films.

The recordable recording film placed between the dielectric films is a film on which irreversible recording marks are formed. The reflectance to the beam 770 is largely different between parts on which the recording marks are formed and the other parts (blank regions). As a result, data can be recorded and reproduced.

The principal component of the recordable recording film is a material including Bi and O. The recordable recording film functions as an inorganic reaction film, and the reflectance largely varies as a result of a chemical or physical change due to the heat of laser light. It is preferable that a material specifically include a principal component of Bi—O or a principal component of Bi—M—O (where M is at least one type of element selected from Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga, and Pb). In the present embodiment, Bi—Ge—O is used as the material of the recordable recording film.

Although the case of adopting the recordable recording films in the L0 to L9 recording and reading layers 14A to 14J is illustrated here, phase-change recording films that can be repeatedly recorded can also be adopted. It is preferable that the phase-change recording films are made of SbTeGe.

As shown in FIG. 4, the intermediate layer group 16 includes first to ninth intermediate layers 16A to 16I in order from the side farther from the light incident surface 10A. The first to ninth intermediate layers 16A to 16I are stacked between the L0 to L9 recording and reading layers 14A to 14J. The intermediate layers 16A to 16I are formed by an acrylic or epoxy ultraviolet curable resin. As for the film thickness of the intermediate layers 16A to 16I, a first distance T1 that is 10 μm or more and a second distance T2 that is greater than the first distance by 3 μm or more are alternately set. Specifically, it is preferable that the difference between the first distance T1 and the second distance T2 is 3 μm to 5 μm, and it is more preferable that the difference is 4 μm or more.

In the multilayer optical recording medium 10, the first distance T1 is 12 μm, and the second distance T2 is 16 μm. In order from the far side, the thickness of the first intermediate layer 16A is 12 μm, the thickness of the second intermediate layer 16B is 16 μm, the thickness of the third intermediate layer 16C is 12 μm, the thickness of the fourth intermediate layer 16D is 16 μm, the thickness of the fifth intermediate layer 16E is 12 μm, the thickness of the sixth intermediate layer 16F is 16 μm, the thickness of the seventh intermediate layer 16G is 12 μm, the thickness of the eighth intermediate layer 16H is 16 μm, and the thickness of the ninth intermediate layer 16I is 12 μm. Thus, the intermediate layers with two types of film thicknesses (16 μm and 12 μm) are alternately stacked. Although described in detail later, this can reduce both the interlayer crosstalk and the confocal crosstalk.

As in the intermediate layer group 16, the cover layer 11 is formed by a light-transmissive acrylic ultraviolet curable resin, and the film thickness is set to 48 μm. Therefore, the distance between the light incident surface 10A and the recording and reading layer 14J closest to the light incident surface 10A is less or equal 60 μm.

A light transmittance improvement process applied to the light incident surface 10A in the cover layer 11 will be described.

Figure 5A:
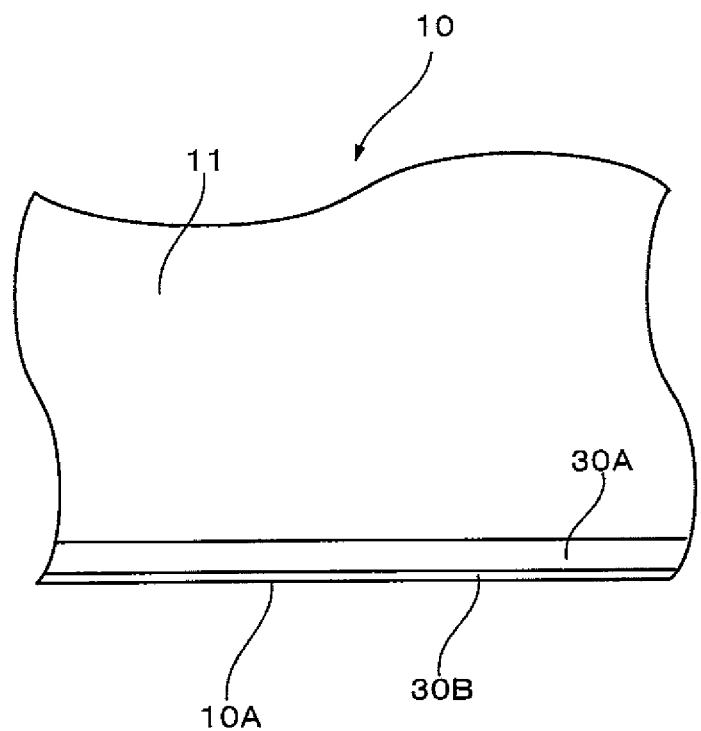
FIG. 5A is a diagram showing a light transmittance improvement process on a light incident surface of the multilayer optical recording medium.

As shown by enlargement in FIG. 5A, a hard coat layer 30A with a film thickness of 2 μm is formed on the surface of the cover layer 11, and a low refractive index film 30B made of $SiO_2$ as a principal component is deposited over the hard coat layer 30A by sputtering at a film thickness of 0.05 μm in the light transmittance improvement process. The refractive index of the cover layer 11 is 1.55, the refractive index of the hard coat layer 30A is 1.60, and the refractive index of the low refractive index film 30B is 1.50. As a result, refractive index of the low refractive index film 30B as the outermost surface of the light incident surface 10A is smaller than that of the cover layer 11. As a result, when the beam 770 with a wavelength of 405 nm is irradiated, the transmittance of the light incident surface 10A is 99.8%. For reference, when the low refractive index film 30B is omitted, the transmittance of the light incident surface 10A is 94.7%. Therefore, the low refractive index film 30B has a light transmittance improvement function of 4% or more (specifically, 1.054 times).

Figure 5B:
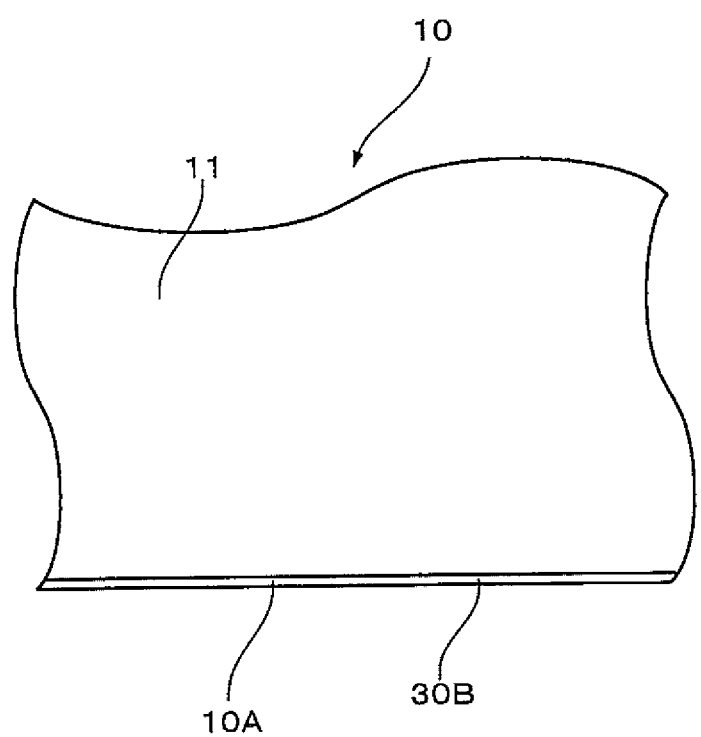
FIG. 5B is a diagram showing another example of the light transmittance improvement process on the light incident surface of the multilayer optical recording medium.

Although the case of forming the low refractive index film 30B over the hard coat layer 30A is illustrated here, the present invention is not limited to this. For example, as shown by enlargement in FIG. 5B, it is also preferable to omit the hard coat layer 30A and directly form the low refractive index film 30B on the surface of the cover layer 11. According to this, the transmittance further improves to 99.9%. For reference, the transmittance is 95.3% when the low refractive index film 30B is omitted to expose the surface of the cover layer 11. Therefore, the low refractive index film 30B has a light transmittance improvement function of 4% or more (specifically, 1.048 times).

Figure 6A:
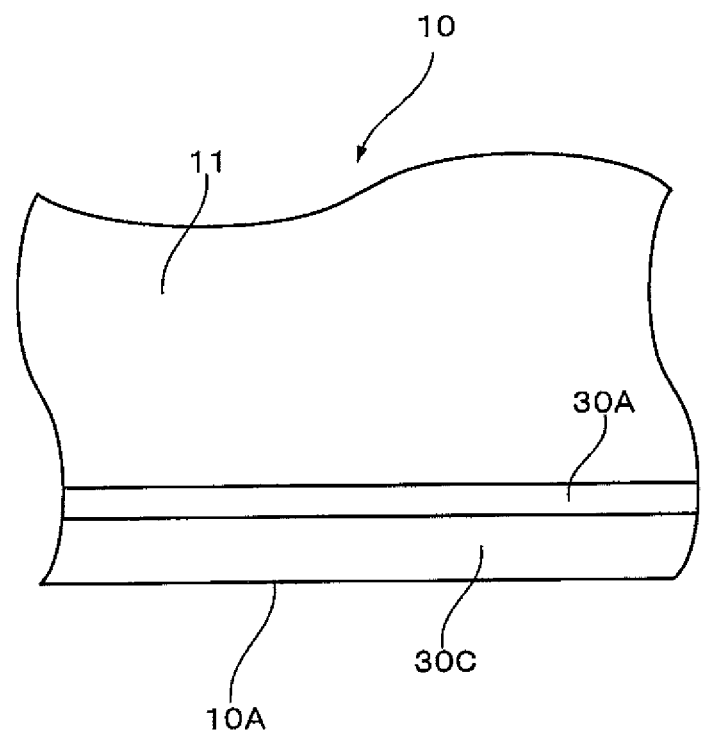
FIG. 6A is a diagram showing yet another example of the light transmittance improvement process on the light incident surface of the multilayer optical recording medium.

Although the case of forming the low refractive index film made of SiO2 as a principal component is illustrated here, the present invention is not limited to this. As shown by enlargement in FIG. 6A, the hard coat layer 30A with a film thickness of 2 μm may be formed on the surface of the cover layer 11, and a low refractive index film 30C made of a fluororesin as a principal component may be deposited over the hard coat layer 30A by spray coating at a film thickness of 5 μm and may be cured by an electron beam. The refractive index of the cover layer 11 is 1.55, the refractive index of the hard coat layer 30A is 1.60, and the refractive index of the low refractive index film 30C made of the fluororesin is 1.45. As a result, the refractive index of the low refractive index film 30C as the outermost surface is smaller than that of the cover layer 11. The transmittance of the light incident surface 10A is 99.7% when the beam 770 with a wavelength of 405 nm is irradiated. Therefore, the low refractive index film 30C has a light transmittance improvement function of 4% or more (specifically, 1.053 times).

Figure 6B:
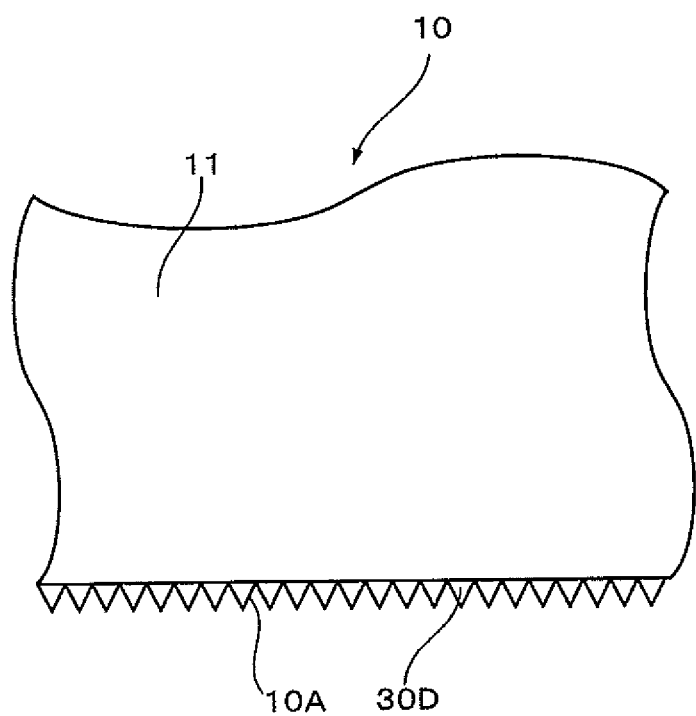
FIG. 6B is a diagram showing yet another example of the light transmittance improvement process on the light incident surface of the multilayer optical recording medium.

Although the case of appropriately selecting a material with a low refractive index to form a low refractive index film on the light incident surface 10A is illustrated here, the present invention is not limited to this. For example, as shown by enlargement in FIG. 6B, it is preferable to use a stamper to deposit the cover layer 11 and form fine concavities and convexities 30D on the surface in the light transmittance improvement process. For example, it is preferable to set the pitch to 1000 nm or less and set the height to 1000 nm or less in a fine concavity and convexity pattern. For example, the pitch is set to 200 nm, and the height is set to about 200 nm. As a result, the transmittance of the light incident surface 10A is 98.2% when the beam 770 with a wavelength of 405 nm is irradiated. As already described, the transmittance is 95.3% when the surface of the cover layer 11 is planarized and exposed. Therefore, the fine concavities and convexities 30D have a light transmittance improvement function of about 3% (specifically, 1.030 times). Although the case of directly forming the fine concavities and convexities 30D on the surface of the cover layer 11 is illustrated here, a curable resin film may be additionally laminated on the surface of the cover layer 11, and a stamper may form the fine concavities and convexities 30D on the surface of the curable resin film.

As described, the single-layer reflectance of the L9 recording and reading layer 14J closest to the light incident surface 10A is set to 0.2% or more and less than 2.0% in the multilayer optical recording medium 10. Meanwhile, the light transmittance improvement ratio based on the light transmittance improvement process formed on the light incident surface 10A is set to 1.020 or more, i.e. 2.0% or more that is the upper limit of the single-layer reflectance of the recording and reading layer group 14. As a result, at least one recording and reading layer can be added based on the light transmittance improvement process.

Particularly, the transmittance of the light incident surface 10A is increased until the transmittance is 98% or more, i.e. until the reflectance of the light incident surface 10A is reduced to less than 2.0%, in the light transmittance improvement process. This denotes that both the reflectance of the light incident surface 10A and the reflectance of the recording and reading layer 14J closest to the light incident surface 10A are set to less than 2.0%. In this way, the effect of the light reflection in the light incident surface 10A can be almost eliminated in relation to the increase in the number of layers in the recording and reading layer group 14.

A manufacturing method of the multilayer optical recording medium 10 will be described. First, the support substrate 12 on which a groove and a land are formed is created by an injection molding method of a polycarbonate resin using a metal stamper. The method of creating the support substrate 12 is not limited to the injection molding method, and the support substrate 12 may be created by a 2P method or other methods.

Subsequently, the L0 recording and reading layer 14A is formed on the surface of the side provided with the groove and the land in the support substrate 12.

Specifically, a vapor growth method is used to sequentially form a dielectric film, a recordable recording film, and a dielectric film. Especially, it is preferable to use a sputtering method. Subsequently, the first intermediate layer 16A is formed over the L0 recording and reading layer 14A. The first intermediate layer 16A is formed by, for example, coating an ultraviolet curable resin with adjusted viscosity by a spin coating method or the like and then irradiating an ultraviolet ray on the ultraviolet curable resin to cure the resin. The procedure is repeated to sequentially stack the L1 recording and reading layer 14B, the second intermediate layer 16B, the L2 recording and reading layer 14C, the third intermediate layer 16C.

Once up to the L9 recording and reading layer 14J is completed, the cover layer 11 is formed over the L9 recording and reading layer 14J. The cover layer 11 is formed by, for example, coating an acrylic or epoxy ultraviolet curable resin with adjusted viscosity by a spin coating method or the like and irradiating an ultraviolet ray on the resin to cure the resin. The hard coat layer 30A is deposited on the surface of the cover layer 11 by spin coating, spray coating, or the like, and the hard coat layer 30A is cured by heating.

The low refractive index film 30B made of SiO2 as a principal component is further deposited over the hard coat layer 30A by the sputtering method to complete the multilayer optical recording medium 10.

Although the manufacturing method has been described in the present embodiment, the present invention is not particularly limited to the manufacturing method, and other manufacturing techniques may also be adopted.

A designing technique of the multilayer optical recording medium 10 will be described.

A specific deposition condition of the recording and reading layer closest to the light incident surface 10A is first designed, and the recording and reading layers are sequentially stacked from the side of the light incident surface. The number of stacked recording and reading layers is increased until the amount of reflected light retuning to the optical detector 732 by reflection from the recording and reading layers is close to a limit value that can be handled by an evaluation device when reading power at a level that does not cause a reproduction degradation is irradiated on the recording and reading layers, or until the laser power is close to a limit value (i.e. limit value of recording sensitivity) of the laser power necessary to form recording marks in the recording and reading layers (modification of recording layers). The upper limit of the number of stacked layers is determined when the recording and reading layers on the far side reach the limit values of the amount of reflected light and the recording sensitivity. Therefore, the application of the light transmittance improvement process to the light incident surface 10A as in the present embodiment increases the number of stacked layers.

When the recording and reading layers with the same configuration are stacked, it is obvious that the amount of reflected light returning from the recording and reading layers to the optical detector 732 in the stacked state monotonically decreases toward the far side from the light incident surface in proportion to the square of the transmission of the recording and reading layers, and the laser power that reaches the recording and reading layers also decreases in proportion to the transmission.

An operation of the multilayer optical recording medium 10 will be described.

The multilayer optical recording medium 10 includes at least one recording and reading layer group 14 including a plurality of recording and reading layers that are continuous in order of stacking In the recording and reading layer group 14, the reflectance in the stacked state decreases from the near side of the light incident surface 10A to the far side. The reflectance in the single-layer state of the recording and reading layer 14J closest to the light incident surface 10A is set to 0.2% or more and less than 2.0%, and as a result, the reflectance in the stacked state of the far side is less than 2.0% which is significantly low. The light transmittance improvement process is applied to the light incident surface 10A in the multilayer optical recording medium 10 under the conditions. Therefore, the number of stacked layers of the recording and reading layer group 14 can be increased, and the signal quality can be increased.

Specifically, one of the factors for determining the limit in increasing the number of recording and reading layers in the multilayer optical recording medium 10 is the light intensity at reaching the recording and reading layer 14A arranged on the farthest side. For example, when the reflectance in the single-layer state of the recording and reading layers is 0.2% or more and less than 2.0%, the light intensity decreases by several percent with each transmission through one recording and reading layer. Under the conditions, the effect of the light reflection in the light incident surface 10A has a large effect on the upper limit of the number of stacked layers. More specifically, the light intensity at entering the medium is increased by about 2% by reducing the optical reflectance in the light incident surface 10A by 2.0% or more. As a result, the light intensity at reaching the farthest recording and reading layer increases, and the number of stacked recording and reading layers can be increased.

Particularly, the reflectance of the light incident surface 10A and the reflectance of the recording and reading layer 14J closest to the light incident surface 10A are reduced until the reflectances are less than 2.0% in the present embodiment. Therefore, the light intensity at reaching the far side of the multilayer optical recording medium 10 increases, and the number of stacked recording and reading layers can be further increased.

The low refractive index film 30B is formed on the surface of the cover layer 11 in the light transmittance improvement process of the light incident surface 10A in the present embodiment. Adopting the deposition technique can significantly easily increase the light transmittance of the light incident surface 10A.

As already described, it is also preferable to form the fine concavities and convexities 30D on the surface of the cover layer 11 in the light transmittance improvement process. Particularly, it is desirable to use a stamper or the like to directly form the fine concavities and convexities 30D on the surface of the cover layer 11, and this can reduce the manufacturing cost.

The stacking reflectance of the L0 to L9 recording and reading layers 14A to 14J decreases from the near side to the far side in the multilayer optical recording medium 10. Therefore, during reading of a specific recording and reading layer, contamination of the reflected light of the recording and reading layer adjacent on the far side of the specific recording and reading layer into the reading light can be suppressed. As a result, the crosstalk can be suppressed even if the thickness of the intermediate layer is reduced, and this can increase the number of stacked layers of the L0 to L9 recording and reading layers 14A to 14J to ten layers or more.

Figure 20:
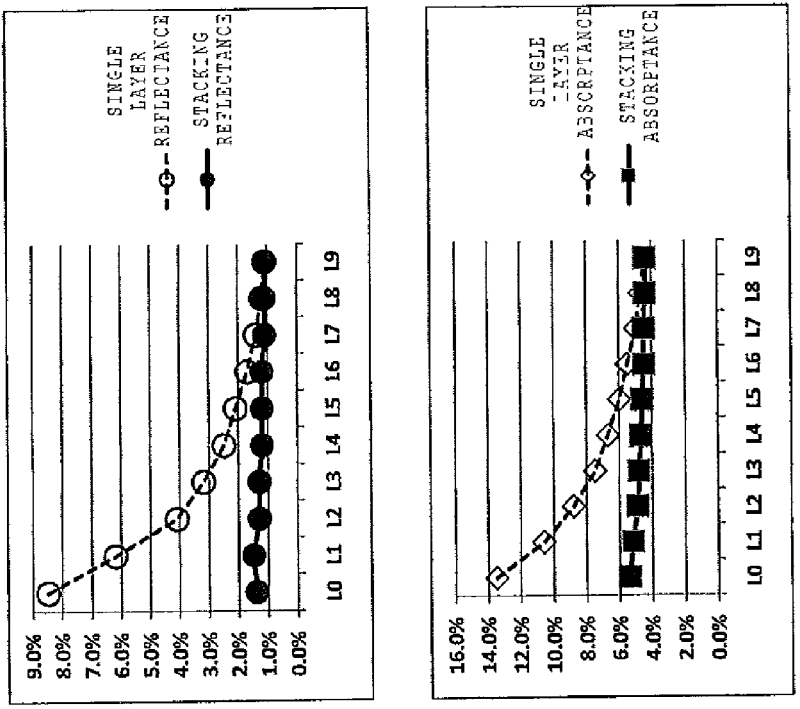
FIG. 20 is a table and graphs showing the reflectance and the absorptance of the multilayer optical recording medium of a reference example.

If the stacking reflectances of all L0 to L9 recording and reading layers 14A to 14J are approximated to near 1.0% as shown in a reference example of FIG. 20, different single-layer reflectances and absorptances need to be set for the L0 to L9 recording and reading layers 14A to 14J, and the manufacturing process becomes significantly complicated. As a result, the layers are easily affected by a manufacturing error, and a design with a margin inclusive of the error is necessary, which makes it difficult to increase the number of stacked layers. An optical design that increases the reflectance of the recording and reading layers from the light incident surface 10A to the far side is required, and the amount of light transmission that reaches the farthest side is reduced. Therefore, the light transmittance improvement process in the light incident surface 10A becomes less meaningful.

Meanwhile, the same film material and film thickness are adopted in the L0 to L9 recording and reading layers 14A to 14J in the present embodiment. Therefore, different deposition conditions are not required for the recording and reading layers, and the burden in designing and manufacturing can be significantly reduced. As a result, substantially the same optical constants are set in the L0 to L9 recording and reading layers 14A to 14J. This can reduce variations in the recording and reading conditions in the recording and reading apparatus, and the control of recording and reading (recording strategy) can be simplified. If various recording and reading layers with different single-layer reflectances and single-layer absorptances are intricately stacked, an optimal recording and reading control needs to be empirically found out, which is considerably difficult.

In the multilayer optical recording medium 10, the intermediate layers with the first film thickness (12 μm) and the intermediate layers with the second film thickness (16 μm) greater than the first film thickness are alternately stacked, and the recording and reading layers 14A to 14J are stacked between the intermediate layers.

Figure 21:
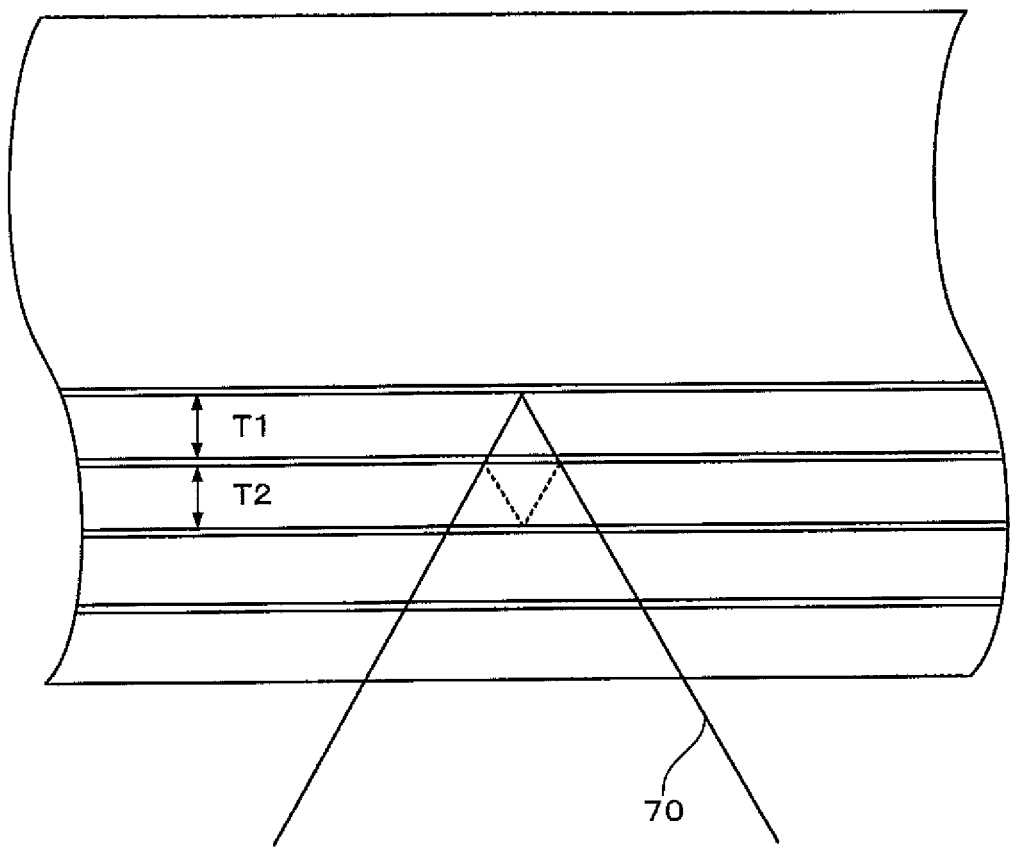
FIG. 21 is a diagram showing a state of the reading light and the stray light in the multilayer optical recording medium.
Figure 22:
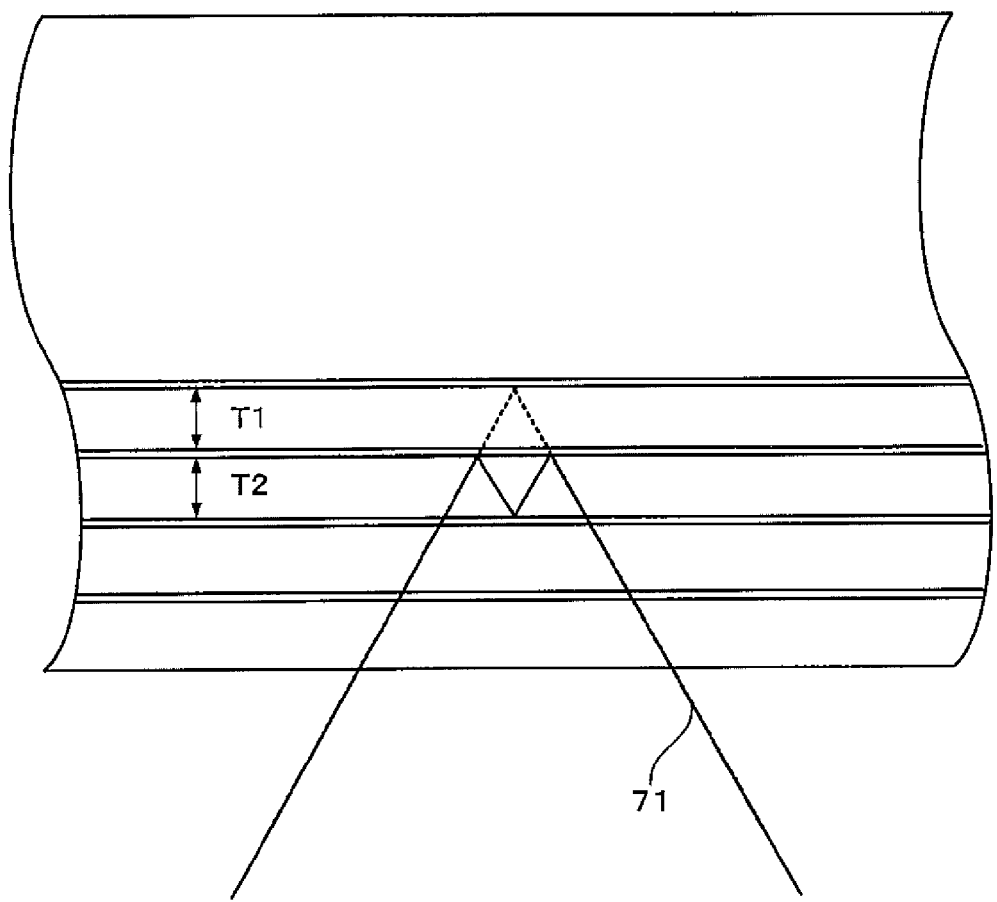
FIG. 22 is a diagram showing a state of the reading light and the stray light in the multilayer optical recording medium.

For example, FIGS. 21 and 22 will be used to describe a confocal crosstalk phenomenon in relation to a multilayer optical recording medium with a four-layer structure. Compared to a beam 70 of FIG. 21, the light intensity of a beam 71 that is multifaceted reflection light as shown in FIG. 22 is generally small. The beams enter the optical detector at an equal optical path length and equal luminous flux diameter, and the effect of interference is relatively large. Therefore, the light intensity received by the optical detector largely varies by a slight change in the thickness between layers, and stable detection of signal becomes difficult. Therefore, different film thicknesses T1 and T2 can be set for adjacent intermediate layers to set different optical path lengths for the beams 70 and 71 to reduce the interference.

Example 1 and Comparative Example 1

Figure 7:
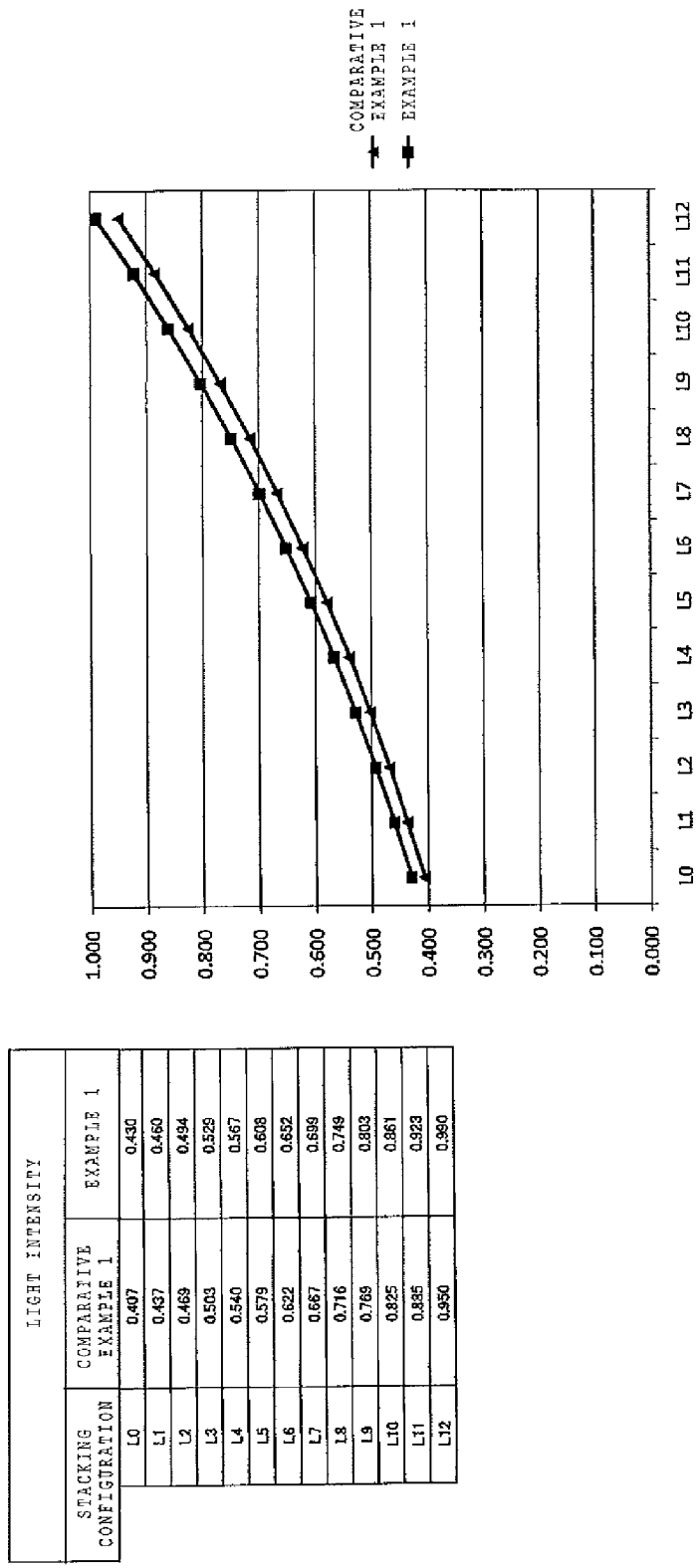
FIG. 7 is a table and a graph showing a state of the light intensity when reading light is irradiated on the multilayer optical recording medium according to Example 1 of the present invention.

In Example 1, the number of stacked recording and reading layers is increased to thirteen layers with a similar configuration as the multilayer optical recording medium 10, and the light transmittance improvement process is applied to the light incident surface 10A to set the light transmittance to 99%. The light intensity in the recording and reading layers is verified. In Comparative Example 1, the light transmittance improvement process is not applied under the same conditions, and the light transmittance of the light incident surface is set to 95%. The light intensity is verified. FIG. 7 shows a graph of the light intensity of Example 1 and Comparative Example 1.

The reflectance in the single-layer state of the recording and reading layers is set to 1.10%, the transmittance is set to 93.3%, and the absorptance is set to 5.6%. The material composition of all recording and reading layers is $TiO_2/Fe_3O_4/BiO_x$—$GeO_y/SiO_2/TiO_2$, and the film thicknesses of all recording and reading layers are conformed. The thickness of the substrate is 1.1 mm, and intermediate layers with thicknesses of 12 μm and 16 μm are alternately arranged.

As can be recognized from the verification result, the light intensity at reaching the farthest recording and reading layer is 43.0% in Example 1, and the light intensity at reaching the farthest recording and reading layer is 40.7% in Comparative Example 1. The difference is about 2%. The light transmittance improvement process of about 4% can be applied to the light incident surface 10A to change the light intensity at reaching the farthest recording and reading layer by 2%.

Example 2

Figure 8:
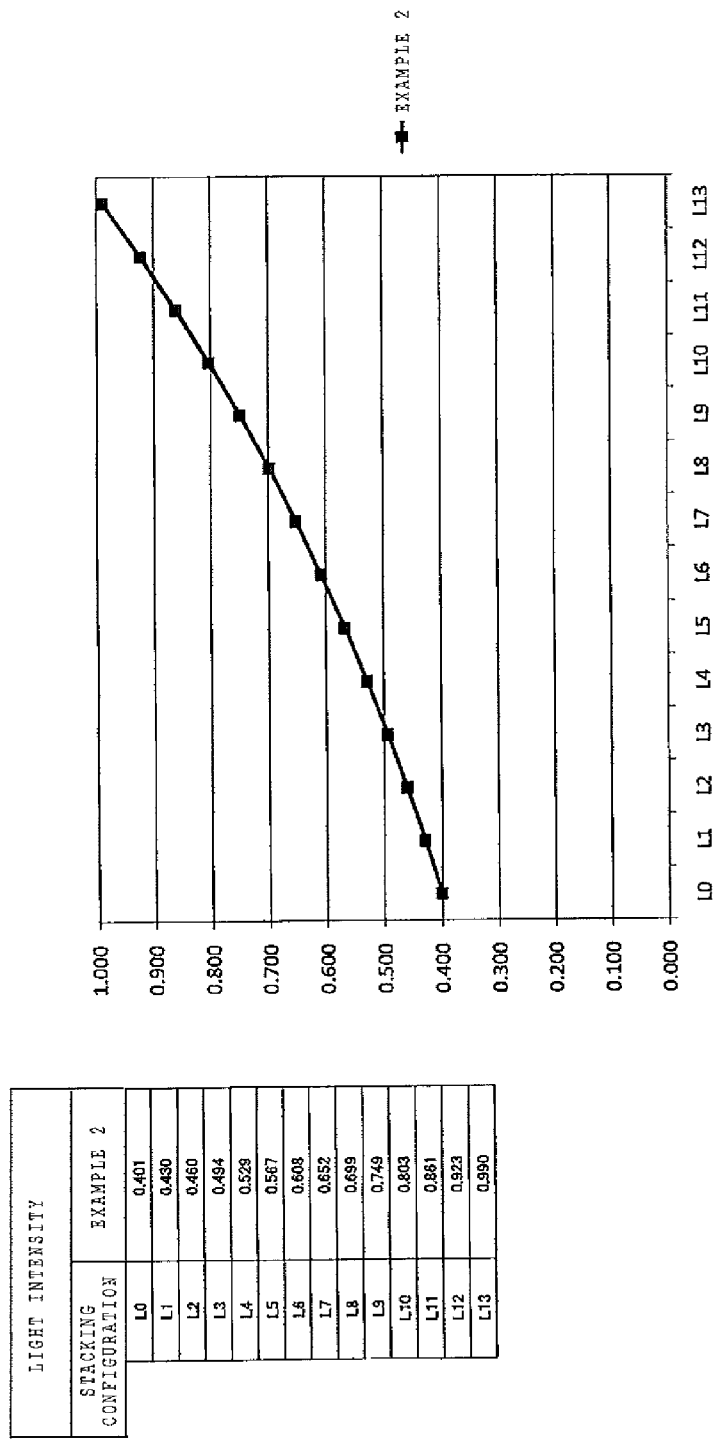
FIG. 8 is a table and a graph showing a state of the light intensity when the reading light is irradiated on the multilayer optical recording medium according to Example 2 of the present invention.

In Example 2, the number of stacked recording and reading layers is changed to fourteen layers with a similar configuration as the multilayer optical recording medium 10 of Example 1, and the light intensity in the recording and reading layers is verified. FIG. 8 shows the result.

As can be recognized from the verification result, the light intensity at reaching the farthest recording and reading layer is 40.1% when the transmittance of the light incident surface 10A is set to 99%. More specifically, it can be recognized that even if the number of stacked recording and reading layers is increased by one, the light intensity at reaching the farthest recording and reading layer is reduced by less than 1% compared to the same light intensity (40.7%) in the multilayer optical recording medium of Comparative Example 1.

Although cases in which the recording and reading layers include ten, thirteen, and fourteen layers have been described in the present embodiment, the present invention is not limited to these. If there are four or more recording and reading layers, the burden in designing is significantly reduced by applying the present invention. Obviously, the number of stacked recording and reading layers can be increased in the present invention as long as the spherical aberration correction range, the laser power, and the like allow the increase, and the number of recording and reading layers can be increased to more than fourteen.

Although the case of alternately stacking the intermediate layers with two types of film thicknesses has been described in the present embodiment, the present invention is not limited to this, and the intermediate layers may not be alternately arranged. All intermediate layers may have the same film thickness.

Although the case including one recording and reading layer group in which the reflectance in the stacked state continuously decreases from the near side of the light incident surface to the far side has been illustrated in the present embodiment, the present invention is not limited to this. For example, two recording and reading layer groups in which the reflectance in the stacked state continuously decreases may be included as in the multilayer optical recording medium with twenty layers shown in FIG. 9. In this case, the reflectance in the single-layer state of the recording and reading layers approximately conforms (for example, 1.5% or 0.7%) if the layers belong to the same recording and reading layer group. It is preferable that the reflectance (0.7%) in the single-layer state common in the recording and reading layer group closest to the light incident surface is smaller than the reflectance (1.5%) of the recording and reading layer group on the far side.

Figure 9:
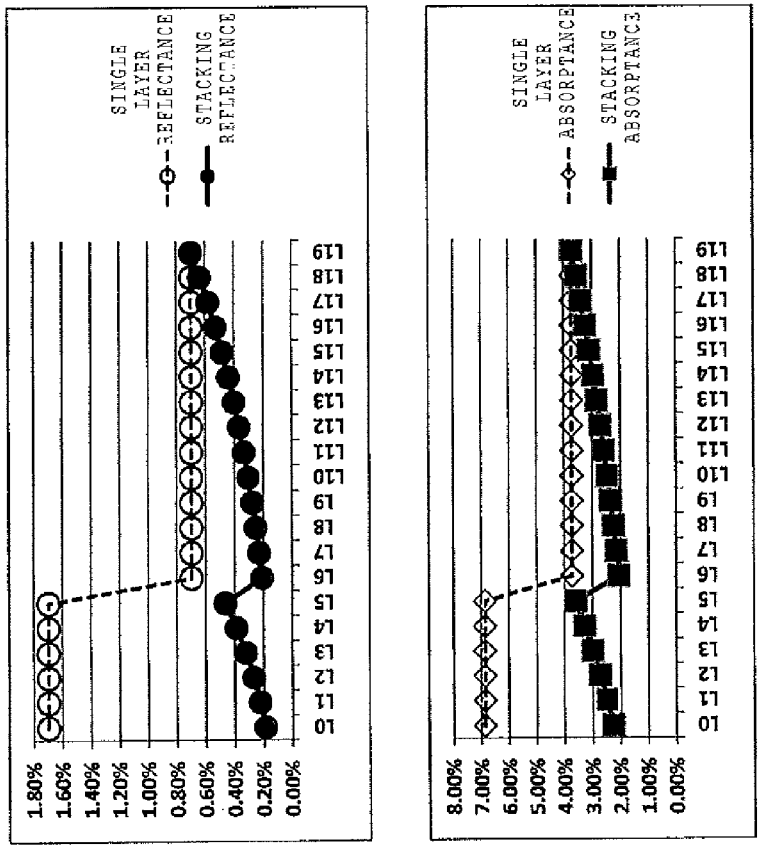
FIG. 9 is a table and graphs showing a state of single-layer reflectance and stacking reflectance of the multilayer optical recording medium according another configuration example of the embodiment of the present invention.

As can be recognized from the example of FIG. 9, the stacking reflectance of the L5 recording and reading layer on the far side is higher between the L6 and L5 recording and reading layers adjacent at a boundary of the two recording and reading layer groups. As a result, the stacking reflectance can be sequentially reduced toward the far side based on the L5 recording and reading layer with the higher stacking reflectance, and the number of stacked layers can be increased while keeping the difference between the stacking reflectance of the L19 recording and reading layer closest to the light incident surface and the stacking reflectance of the L0 recording and reading layer farthest from the light incident surface small. Specifically, the largest stacking reflectance among all L0 to L19 recording and reading layers is less or equal five times the smallest stacking reflectance. It is preferable that the largest stacking reflectance is less or equal four times the smallest stacking reflectance, and it is desirable that the largest stacking reflectance is less or equal three times the smallest stacking reflectance.

An interlayer crosstalk easily occurs between the L6 recording and reading layer and the L5 recording and reading layer where the stacking reflectance is turned over. Therefore, it is preferable to set the layers thicker among the intermediate layers.

A designing technique when a plurality of recording and reading layer groups are adopted will be described. A specific deposition condition (second deposition condition) is designed for the recording and reading layers on the side of the light incident surface, and the layers are sequentially stacked from the side of the light incident surface. The number of stacked recording and reading layers can be increased until the amount of reflected light retuning to the optical detector by reflection from the recording and reading layers is close to a limit value that can be handled by the evaluation device when reading power at a level that does not cause a reproduction degradation is irradiated on the recording and reading layers, or until the laser power is close to a limit value (i.e. limit value of recording sensitivity) of the laser power necessary to form recording marks in the recording and reading layers (modification of recording layers). Once the recording and reading layer on the far side reaches the limit values of the amount of reflected light and the recording sensitivity, the recording and reading layers are grouped as a recording and reading layer group. In the present embodiment, from the L19 recording and reading layer to the L6 recording and reading layer are grouped as a second recording and reading layer group. In this case, the number of stacked layers can be increased by applying the light transmittance improvement process to the light incident surface in the multilayer optical recording medium.

The recording and reading layers stacked farther than the second recording and reading layer group are then designed. If the same deposition condition as in the second recording and reading layer group is maintained, the layers exceed the limit values of the amount of reflected light and the recording sensitivity. Therefore, a next deposition condition (first deposition condition) that increases the reflectance and the absorptance in the single-layer state is designed to prevent exceeding of the limit values. The recording and reading layers in which the deposition condition is adopted are sequentially stacked toward the far side. As in the second recording and reading layer group, the number of stacked recording and reading layers can be increased up to the limit value of the amount of reflected light that can be handled by the evaluation device or up to the limit value of the laser power, or until the target number of stacked layers is attained. Once the target is attained, the recording and reading layers are grouped as a recording and reading layer group. In the present embodiment, from the L5 recording and reading layer to the L0 recording and reading layer are grouped as a first recording and reading layer group.

Example 3 and Comparative Example 2

Figure 10:
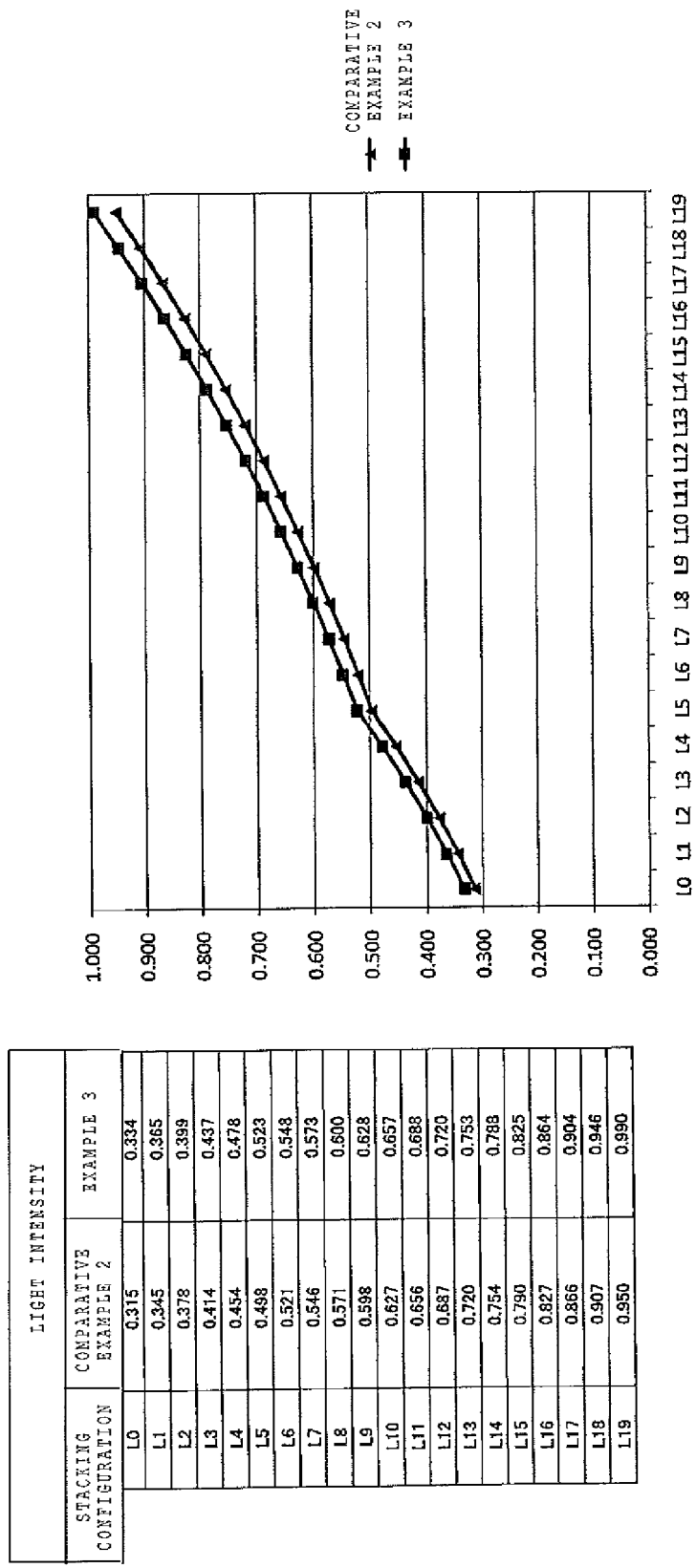
FIG. 10 is a table and a graph showing a state of the light intensity when the reading light is irradiated on the multilayer optical recording medium according to Example 3 of the present invention.

In Example 3, the light transmittance improvement process is applied to the light incident surface 10A in the multilayer optical recording medium 10 including the first and second recording and reading layer groups shown in FIG. 9 to set the light transmittance to 99%, and the light intensity in the recording and reading layers is verified. In Comparative Example 2, the light transmittance improvement process is not applied under the same conditions, and the light intensity when the light transmittance of the light incident surface is set to 95% is verified. FIG. 10 shows a graph of the light intensity of Example 3 and Comparative Example 2.

The reflectance in the single-layer state of the L0 to L5 recording and reading layers belonging to the first recording and reading layer group is set to 1.70%, and the transmittance is set to 91.4%. The reflectance in the single-layer state of the L6 to L19 recording and reading layers belonging to the second recording and reading layer group is set to 0.70%, and the transmittance is set to 95.5%. The material composition of all recording and reading layers is $TiO_2/Fe_3O_4/BiO_x$—$GeO_y/SiO_2/TiO_2$, and the film thicknesses of all recording and reading layers are conformed. The thickness of the substrate is 1.1 mm, and intermediate layers with thicknesses of 12 μm and 16 μm are alternately arranged.

As can be recognized from the verification result, the light intensity at reaching the farthest recording and reading layer is 33.4% in Example 3, and the light intensity at reaching the farthest recording and reading layer is 31.5% in Comparative Example 2. The difference is about 2%. Even if the number of stacked layers is increased, the light transmittance improvement process of about 4% can be applied to the light incident surface 10A to change the light intensity at reaching the farthest recording and reading layer by 2%.

Example 4

Figure 11:
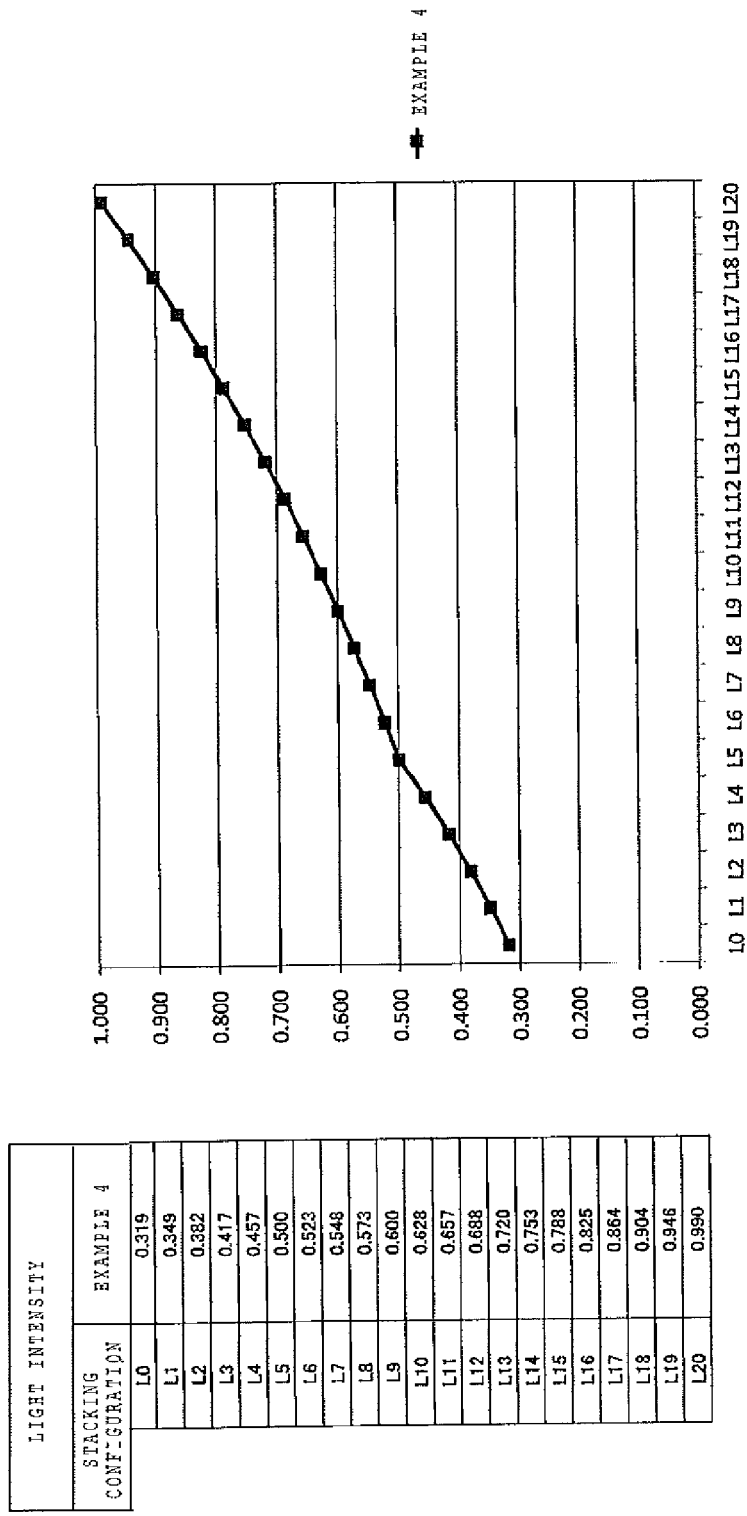
FIG. 11 is a table and a graph showing a state of the light intensity when the reading light is irradiated on the multilayer optical recording medium according to Example 4 of the present invention.

In Example 4, the number of recording and reading layers belonging to the second recording and reading layer group is increased by one under a similar configuration as the multilayer optical recording medium 10 of Example 3. The overall number of stacked recording and reading layers is changed to twenty one, and the light intensity in the recording and reading layers is verified. FIG. 11 shows the result.

As can be recognized from the verification result, the light intensity at reaching the farthest recording and reading layer is 31.9% when the transmittance of the light incident surface 10A is set to 99%. More specifically, it can be recognized that even if the number of stacked recording and reading layers is increased by one, the light intensity (31.9%) at the farthest recording and reading layer of Example 4 is greater than the light intensity (31.5%) at the farthest recording and reading layer of Comparative Example 2.

To further increase the number of stacked layers, a new deposition condition that further increases the reflectance and the absorptance in the single-layer state can be determined. The layers can be further stacked on the far side, and a new recording and reading layer group can be formed. For example, as shown in FIG. 12, the number of recording and reading layer groups may be three or more.

Example 5 and Comparative Example 3

Figure 12:
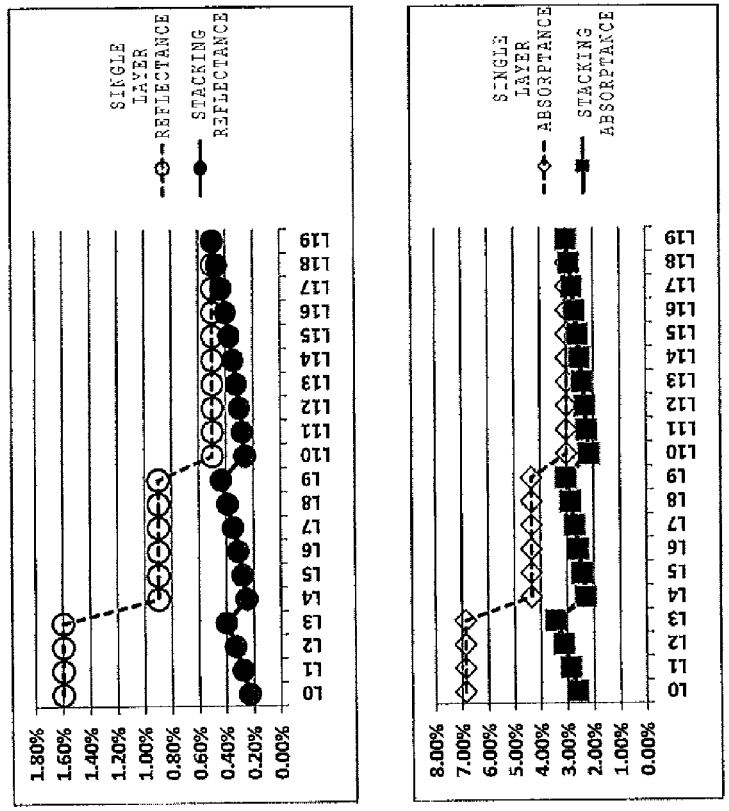
FIG. 12 is a table and graphs showing a state of the single-layer reflectance and the stacking reflectance of the multilayer optical recording medium according to yet another configuration example of the embodiment of the present invention.
Figure 13:
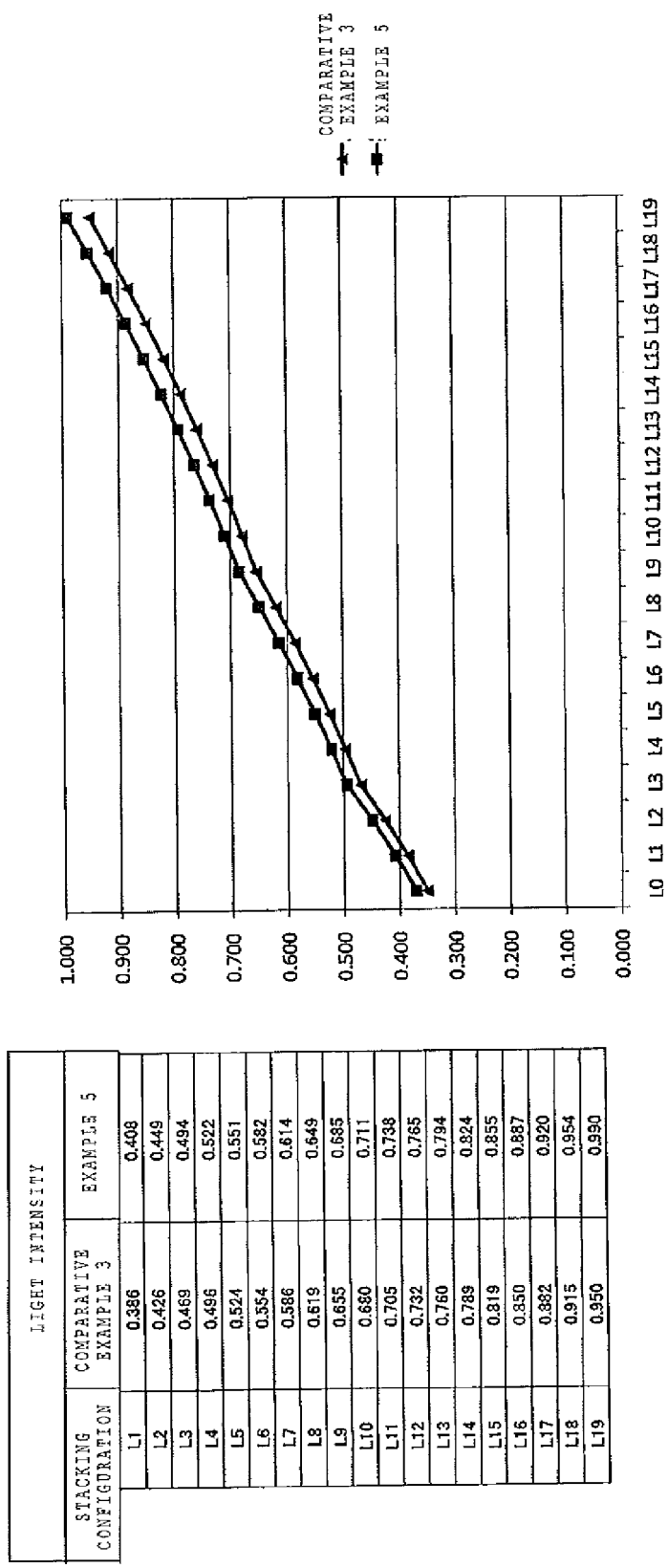
FIG. 13 is a table and a graph showing a state of the light intensity when the reading light is irradiated on the multilayer optical recording medium according to Example 5 of the present invention.

In Example 5, the light transmittance improvement process is applied to the light incident surface 10A in the multilayer optical recording medium 10 including the first, second, and third recording and reading layer groups shown in FIG. 12 to set the light transmittance to 99%, and the light intensity in the recording and reading layers is verified. In Comparative Example 3, the light transmittance improvement process is not applied under the same conditions, and the light intensity when the light transmittance of the light incident surface is set to 95% is verified. FIG. 13 shows a graph of the light intensity of Example 5 and Comparative Example 3.

The reflectance in the single-layer state of the L0 to L3 recording and reading layers belonging to the first recording and reading layer group is set to 1.60%, and the transmittance is set to 90.9%. The reflectance in the single-layer state of the L4 to L9 recording and reading layers belonging to the second recording and reading layer group is set to 0.90%, and the transmittance is set to 94.7%. The reflectance in the single-layer state of the L10 to L19 recording and reading layers belonging to the third recording and reading layer group is set to 0.50%, and the transmittance is set to 96.4%. The material composition of all recording and reading layers is $TiO_2/Fe_3O_4/BiO_x$—$GeO_y/SiO_2/TiO_2$, and the film thicknesses of all recording and reading layers are conformed. The thickness of the substrate is 1.1 mm, and intermediate layers with thicknesses of 12 μm and 16 μm are alternately arranged.

As can be recognized from the verification result, the light intensity at reaching the farthest recording and reading layer is 37.0% in Example 5, and the light intensity at reaching the farthest recording and reading layer is 35.1% in Comparative Example 3. The difference is about 2%. Even if the number of stacked layers is increased, the light transmittance improvement process of about 4% can be applied to the light incident surface 10A to change the light intensity at reaching the farthest recording and reading layer by 2%.

Example 6

Figure 14:
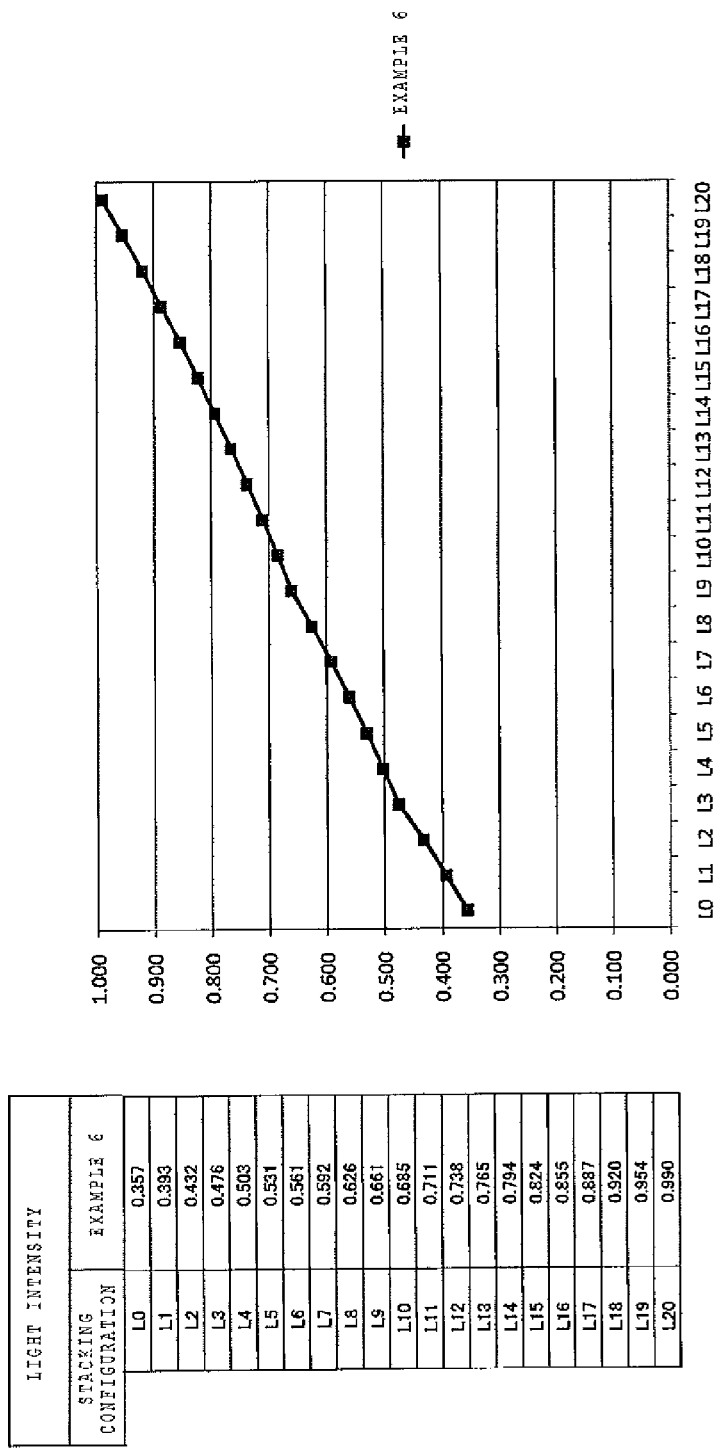
FIG. 14 is a table and a graph showing a state of the light intensity when the reading light is irradiated on the multilayer optical recording medium according to Example 6 of the present invention.

In Example 6, the number of recording and reading layers belonging to the third recording and reading layer group is increased by one with a similar configuration as the multilayer optical recording medium 10 of Example 5. The overall number of stacked recording and reading layers is changed to twenty one, and the light intensity in the recording and reading layers is verified. FIG. 14 shows the result.

As can be recognized from the verification result, the light intensity at reaching the farthest recording and reading layer is 35.7% when the transmittance of the light incident surface 10A is set to 99%. More specifically, it can be recognized that even if the number of stacked recording and reading layers is increased by one, the light intensity (35.7%) at the farthest recording and reading layer of Example 6 is greater than the light intensity (35.1%) at the farthest recording and reading layer of Comparative Example 3.

Although the recording and reading layers are formed in advance in the multilayer optical recording medium illustrated in the embodiment and the examples, the present invention is not limited to this. For example, the entire locations that can be a plurality of recording and reading layers in the future can be a united bulk layer with a predetermined thickness in the optical recording medium. When the bulk layer is irradiated by a beam, the state of only the focused parts of the beam spots are changed to form recording marks. More specifically, the multilayer optical recording medium of the present invention is not limited to the medium in which the recording and reading layers to which the beam is applied are formed in advance. Recording marks can be sequentially formed on flat regions in the bulk, and a plurality of recording and reading layers as an aggregate of the recording marks can be formed later. Particularly, as shown in FIGS. 9 and 12, when the recording and reading layer groups including a plurality of recording and reading layers with the same single-layer reflectance are formed in a plurality of stages, it is preferable to prepare separate bulk layers with different optical characteristics in accordance with the recording and reading layer groups. For example, to form the first to third recording and reading layer groups as shown in FIG. 12 later, first to third bulk layers formed by materials with different reflectances can be prepared. The L0 to L3 recording and reading layers can be formed later in the first bulk layer to set the first recording and reading layer group. The L4 to L9 recording and reading layer can be formed later in the second bulk layer to set the second recording and reading layer group. The L10 to L19 recording and reading layers can be formed later in the third bulk layer to set the third recording and reading layer group.

The multilayer optical recording medium of the present invention is not limited to the embodiment, and it is obvious that various changes can be made without departing from the scope of the present invention.

The multilayer optical recording medium of the present invention can be applied to optical recording media of various standards.

The entire disclosure of Japanese Patent Application No. 2011-25584 filed on 9 Feb. 2011 including specification, claims, drawings, and summary are incorporated herein by reference in its entirety.

What is claimed is:

1. A multilayer optical recording medium comprising at least four recording and reading layers from which information can be reproduced by light irradiation, the layers are stacked in advance or a stacked united bulk layer in which the layers are formed later, wherein
    a reflectance in a single-layer state of the recording and reading layer closest to a light incident surface is set to 0.2% or more and less than 2.0%;
    a light transmittance improvement layer is formed on the light incident surface;
    a cover layer formed by a substantially transparent resin material is arranged between the light incident surface and the recording and reading layer closest to the light incident surface; and
    wherein the light transmittance improvement layer comprising a low refractive index film with a lower refractive index in recording light or reading light compared to the refractive index of the cover layer formed on a surface of the cover layer.

2. The multilayer optical recording medium according to claim 1, further comprising
    at least one recording and reading layer group including the plurality of recording and reading layers that are continuous in order of stacking and in which the reflectance in a stacked state decreases from a near side of the light incident surface to a far side of the light incident surface.

3. The multilayer optical recording medium according to claim 1, wherein
    the light transmittance improvement layer improves light transmittance in the light incident surface by 2.0% or more.

4. The multilayer optical recording medium according to claim 1, wherein
    the reflectance of the light incident surface and the reflectance of the recording and reading layer closest to the light incident surface are set to less than 2.0%.

5. The multilayer optical recording medium according to claim 3, wherein
    the reflectance of the light incident surface and the reflectance of the recording and reading layer closest to the light incident surface are set to less than 2.0%.

6. The multilayer optical recording medium according to claim 1, wherein
    interlayer distances between the recording and reading layers are set to two or fewer types.

7. The multilayer optical recording medium according to claim 3, wherein
    interlayer distances between the recording and reading layers are set to two or fewer types.

8. The multilayer optical recording medium according to claim 1, wherein
    first intermediate layers with a first film thickness and second intermediate layers with a second film thickness greater than the first film thickness are alternately stacked, and the recording and reading layers are stacked between the first and second intermediate layers.

9. The multilayer optical recording medium according to claim 3, wherein
    first intermediate layers with a first film thickness and second intermediate layers with a second film thickness greater than the first film thickness are alternately stacked, and the recording and reading layers are stacked between the first and second intermediate layers.

10. The multilayer optical recording medium according to claim 2, wherein
    the recording and reading layer group is stacked in advance in the multilayer optical recording medium, and
    material compositions and film thicknesses of the recording and reading layers belonging to the same recording and reading layer group are substantially the same.

11. The multilayer optical recording medium according to claim 2, wherein
    optical constants of the recording and reading layers belonging to the same recording and reading layer group are substantially the same.

12. The multilayer optical recording medium according to claim 2, wherein
    the number of the recording and reading layer groups is two or more, the reflectances in the single-layer state of the recording and reading layers substantially conform within the belonging recording and reading layer group, and
    the reflectance of the recording and reading layer group closest to the light incident surface is smaller than the reflectances of the rest of the recording and reading layer groups.

13. The multilayer optical recording medium according to claim 1, wherein
    a wavelength of irradiation light used in recording or reading of the recording and reading layers is 405 nm.

14. The multilayer optical recording medium according to claim 1, wherein
    a distance between the light incident surface and the recording and reading layer closest to the light incident surface is less or equal 60 μm.

15. A multilayer optical recording medium comprising at least four recording and reading layers from which information can be reproduced by light irradiation, the layers are stacked in advance or a stacked united bulk layer in which the layers are formed later, wherein
- a reflectance in a single-layer state of the recording and reading layer closest to a light incident surface is set to 0.2% or more and less than 2.0%, and;
- a light transmittance improvement layer is formed on the light incident surface;
- a cover layer formed by a substantially transparent resin material is arranged between the light incident surface and the recording and reading layer closest to the light incident surface, and
- the light transmittance improvement layer comprising; fine concavities and convexities formed on a surface of the cover layer.

16. The multilayer optical recording medium according to claim 15, wherein
- the light transmittance improvement layer improves light transmittance in the light incident surface by 2.0% or more.

17. The multilayer optical recording medium according to claim 15, wherein
- the light transmittance improvement layer; comprising fine concavities and convexities is directly formed on the surface of the cover layer.

* * * * *